(12) United States Patent
Hammer et al.

(10) Patent No.: US 10,949,382 B2
(45) Date of Patent: Mar. 16, 2021

(54) USER-CENTRIC INTERFACES FOR INFORMATION MANAGEMENT SYSTEMS

(71) Applicant: CommVault Systems, Inc., Tinton Falls, NJ (US)

(72) Inventors: N. Robert Hammer, Tequesta, FL (US); Rajiv Kottomtharayil, Marlboro, NJ (US); Manas Bhikchand Mutha, Ocean, NJ (US); Pavan Kumar Reddy Bedadala, Piscataway, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 325 days.

(21) Appl. No.: 14/598,140

(22) Filed: Jan. 15, 2015

(65) Prior Publication Data

US 2015/0199367 A1    Jul. 16, 2015

Related U.S. Application Data

(60) Provisional application No. 61/927,654, filed on Jan. 15, 2014.

(51) Int. Cl.
  *G06F 16/11*      (2019.01)
  *G06F 16/13*      (2019.01)
  (Continued)

(52) U.S. Cl.
  CPC ........ *G06F 16/125* (2019.01); *G06F 11/1448* (2013.01); *G06F 16/113* (2019.01);
  (Continued)

(58) Field of Classification Search
  CPC ......... G06F 17/30085; G06F 17/30091; G06F 17/30112; G06F 17/30156
  (Continued)

(56) References Cited

U.S. PATENT DOCUMENTS 4,686,620 A    8/1987  Ng
4,995,035 A    2/1991  Cole et al.
(Continued)

FOREIGN PATENT DOCUMENTS

EP    0259912 A1    3/1988
EP    0405926 A2    1/1991
(Continued)

OTHER PUBLICATIONS

U.S. Appl. No. 14/274,439, filed May 9, 2014, Vibhor et al.
(Continued)

*Primary Examiner* — Ashish Thomas
*Assistant Examiner* — Abdullah A Daud
(74) *Attorney, Agent, or Firm* — Knobbe Martens Olson & Bear LLP

(57) ABSTRACT

Disclosed are systems and methods for providing a user-centric interface into an information management system. The interface may enable a user to search for, view, and modify data objects in an information management system that are associated with the user or with the user's username. The interface may also enable a user to apply administrator-like functions to the data objects associated with the user. The administrator-like functions may include content modification, deduplication operations, and storage policy adjustments, among others.

19 Claims, 14 Drawing Sheets

(51) Int. Cl.
  *G06F 16/14* (2019.01)
  *G06F 16/174* (2019.01)
  *G06F 11/14* (2006.01)

(52) U.S. Cl.
  CPC ............ *G06F 16/13* (2019.01); *G06F 16/156* (2019.01); *G06F 16/1748* (2019.01)

(58) Field of Classification Search
  USPC ......................................................... 707/654
  See application file for complete search history.

(56) References Cited

U.S. PATENT DOCUMENTS

| | | | |
|---|---|---|---|
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,678,042 A | 10/1997 | Pisello et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem | |
| 6,094,416 A | 7/2000 | Ying | |
| 6,131,095 A | 10/2000 | Low et al. | |
| 6,131,147 A | 10/2000 | Takagi | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,199,074 B1 * | 3/2001 | Kern .................. G06F 11/2058 | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,418,478 B1 | 7/2002 | Ignatius et al. | |
| 6,421,711 B1 | 7/2002 | Blumenau et al. | |
| 6,487,561 B1 | 11/2002 | Ofek et al. | |
| 6,519,679 B2 | 2/2003 | Devireddy et al. | |
| 6,538,669 B1 | 3/2003 | Lagueux, Jr. et al. | |
| 6,542,972 B2 | 4/2003 | Ignatius et al. | |
| 6,564,228 B1 | 5/2003 | O'Connor | |
| 6,625,747 B1 | 9/2003 | Tawil et al. | |
| 6,658,436 B2 | 12/2003 | Oshinsky et al. | |
| 6,658,526 B2 | 12/2003 | Nguyen et al. | |
| 6,771,595 B1 | 8/2004 | Gilbert et al. | |
| 6,820,035 B1 | 11/2004 | Zahavi | |
| 7,007,042 B2 | 2/2006 | Lubbers et al. | |
| 7,035,880 B1 | 4/2006 | Crescenti et al. | |
| 7,039,827 B2 | 5/2006 | Meyer et al. | |
| 7,082,441 B1 | 7/2006 | Zahavi et al. | |
| 7,085,904 B2 | 8/2006 | Mizuno et al. | |
| 7,093,089 B2 | 8/2006 | de Brebisson | |
| 7,093,194 B2 | 8/2006 | Nelson | |
| 7,096,269 B2 | 8/2006 | Yamagami | |
| 7,096,315 B2 | 8/2006 | Takeda et al. | |
| 7,103,740 B1 | 9/2006 | Colgrove et al. | |
| 7,130,970 B2 | 10/2006 | Devassy et al. | |
| 7,146,377 B2 | 12/2006 | Nowicki et al. | |
| 7,171,459 B2 | 1/2007 | Sanghvi et al. | |
| 7,197,490 B1 | 3/2007 | English | |
| 7,203,944 B1 | 4/2007 | van Rietschote et al. | |
| 7,213,040 B1 | 5/2007 | Stokes et al. | |
| 7,216,244 B2 | 5/2007 | Amano | |
| 7,225,356 B2 | 5/2007 | Monitzer | |
| 7,243,093 B2 | 7/2007 | Cragun et al. | |
| 7,275,103 B1 | 9/2007 | Thrasher et al. | |
| 7,287,063 B2 | 10/2007 | Baldwin et al. | |
| 7,328,260 B1 | 2/2008 | Muthiyan et al. | |
| 7,343,356 B2 | 3/2008 | Prahlad et al. | |
| 7,343,453 B2 | 3/2008 | Prahlad et al. | |
| 7,343,459 B2 | 3/2008 | Prahlad et al. | |
| 7,346,623 B2 | 3/2008 | Prahlad et al. | |
| 7,346,751 B2 | 3/2008 | Prahlad et al. | |
| 7,395,282 B1 | 7/2008 | Crescenti et al. | |
| 7,401,338 B1 | 7/2008 | Bowen et al. | |
| 7,403,987 B1 | 7/2008 | Marinelli et al. | |
| 7,454,569 B2 | 11/2008 | Kavuri et al. | |
| 7,493,300 B2 | 2/2009 | Palmer et al. | |
| 7,565,661 B2 | 7/2009 | Sim-Tang | |
| 7,606,844 B2 * | 10/2009 | Kottomtharayil ..... G06F 3/0619 | |
| 7,640,496 B1 | 12/2009 | Chaulk et al. | |
| 7,644,245 B2 | 1/2010 | Prahlad et al. | |
| 7,685,128 B2 | 3/2010 | Anderson et al. | |
| 7,765,167 B2 | 7/2010 | Prahlad et al. | |
| 7,917,695 B2 | 3/2011 | Ulrich et al. | |
| 7,934,071 B2 | 4/2011 | Abe et al. | |
| 7,945,810 B2 | 5/2011 | Soran et al. | |
| 8,060,587 B2 | 11/2011 | Ahmad et al. | |
| 8,112,605 B2 | 2/2012 | Kavuri | |
| 8,195,800 B2 | 6/2012 | Tameshige et al. | |
| 8,255,418 B2 | 8/2012 | Fuhry et al. | |
| 8,266,406 B2 | 9/2012 | Kavuri | |
| 8,306,926 B2 | 11/2012 | Prahlad et al. | |
| 8,315,981 B2 * | 11/2012 | Prahlad ............... H04L 67/1097 | |
| | | | 707/640 |
| 8,578,487 B2 | 11/2013 | Soeder | |
| 8,751,438 B2 | 6/2014 | Kharod et al. | |
| 9,021,452 B2 | 4/2015 | Kripalani | |
| 9,208,474 B2 * | 12/2015 | McKeown ........... G06Q 10/103 | |
| 9,298,715 B2 * | 3/2016 | Kumarasamy ........ G06F 16/128 | |
| 2002/0198765 A1 * | 12/2002 | Magrino .......... G06Q 10/06398 | |
| | | | 705/7.42 |
| 2003/0065759 A1 | 4/2003 | Britt et al. | |
| 2005/0091369 A1 | 4/2005 | Jones | |
| 2006/0064434 A1 * | 3/2006 | Gilbert .................. G06Q 10/06 | |
| 2007/0043715 A1 * | 2/2007 | Kaushik ............... G06F 16/951 | |

(56) References Cited

U.S. PATENT DOCUMENTS

| | | | |
|---|---|---|---|
| 2007/0143371 A1* | 6/2007 | Kottomtharayil | G06F 16/184 |
| 2009/0254593 A1* | 10/2009 | Halim | G06F 11/1461 |
| 2010/0312754 A1* | 12/2010 | Bear | G06F 16/134 |
| | | | 707/685 |
| 2011/0125715 A1* | 5/2011 | Kottomtharayil | G06F 16/134 |
| | | | 707/654 |
| 2011/0145207 A1* | 6/2011 | Agrawal | G06F 16/1748 |
| | | | 707/692 |
| 2012/0150810 A1* | 6/2012 | Yu | G06F 11/1461 |
| | | | 707/654 |
| 2013/0006883 A1* | 1/2013 | McKeown | G06Q 10/1057 |
| | | | 705/320 |
| 2013/0054642 A1 | 2/2013 | Morin | |
| 2013/0238562 A1* | 9/2013 | Kumarasamy | G06F 9/45558 |
| | | | 707/649 |
| 2013/0282672 A1* | 10/2013 | Tashiro | G06F 3/0608 |
| | | | 707/692 |
| 2014/0181085 A1 | 6/2014 | Gokhale et al. | |
| 2014/0317063 A1* | 10/2014 | Patterson | G06F 17/00 |
| | | | 707/685 |
| 2016/0066189 A1* | 3/2016 | Mahaffey | H04M 15/7652 |
| | | | 455/405 |

FOREIGN PATENT DOCUMENTS

| | | | | |
|---|---|---|---|---|
| EP | 0467546 | A2 | 1/1992 | |
| EP | 0774715 | A1 | 5/1997 | |
| EP | 0809184 | A1 | 11/1997 | |
| EP | 0899662 | A1 | 3/1999 | |
| EP | 0981090 | A1 | 2/2000 | |
| WO | WO-9513580 | A1 | 5/1995 | |
| WO | WO-9912098 | A1 | 3/1999 | |
| WO | WO 2007021842 | A2 * | 2/2007 | G06F 17/30386 |
| WO | WO-2007021842 | A2 * | 2/2007 | G06F 16/951 |

OTHER PUBLICATIONS

U.S. Appl. No. 14/668,317, filed Mar. 25, 2015, Kripalani et al.
U.S. Appl. No. 14/737,382, filed Jun. 11, 2015, Hammer et al.
"2003 Gold: CommVault QiNetix 4.2," SearchStorage.com, downloaded from: searchstorage.techtarget.com/news/article/0,289142,sid5 gci942854,00.html, Dec. 30, 2003, pp. 1-3.
"CommVault QiNetix: Dynamic Data Management," Product brochure downloaded from: www.stephord.com/book%5CQiNetix_Brochure.pdf, CommVault Systems, Inc., © 2003, pp. 1-6.
"CommVault QiNetix: Galaxy Backup and Recovery—Data Protection," Product brochure downloaded from: www.hitachidatasystems.com/assets/pdf/ProductTriF old_ Galaxy .pdf, Comm Vault Systems, Inc., © 2002, pp. 1-5.
"CommVault QiNetix: Galaxy iDataAgent for SharePoint Portal Server," Product brochure downloaded from: directory .partners. extranet.microsoft.com/collaterai/2123/DS_GBR_MSFTSPPServer .pdf, CommVault Systems, Inc., © 2002, pp. 1-2.
Agrawal, Dakshi, et al., "Policy-Based Validation of SAN Configuration", Policy '04, Jun. 7-9, 2004, pp. 77-86.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Beck, Micah, et al., "The Internet2 Distributed Storage Infrastructure Project: An Architecture for Internet Content Channels", Computer Networks and ISDN Systems, vol. 30, Issues 22-23, Nov. 1998, pp. 2141-2148.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Charlu, Daniel, "HP Hyperplex Clustering Technology", Proc. of the 1st IEEE Computer Science Workshop on Cluster Computing, Melbourne, Australia, Dec. 2-3, 1999, pp. 347-356.
Eitel, "Backup and Storage Management in Distributed Heterogeneous Environments," IEEE, Jun. 12-16, 1994, pp. 124-126.
Gait, J., "The Optical File Cabinet: A Random-Access File System for Write-Once Optical Disks," IEEE Computer, vol. 21, No. 6, pp. 11-22 (Jun. 1988).
Hirao, Tetsuhiro, et al., "Resource Management", Fujitsu Tech. J., vol. 40, No. 1, Jun. 2004, pp. 123-132.
Jander, M., "Launching Storage-Area Net," *Data Communications*, US, McGraw Hill, NY, vol. 27, No. 4 (Mar. 21, 1998), pp. 64-72.
Kaczmarski, M., et al., "Beyond Backup Toward Storage Management", IBM Systems Journal, vol. 42, No. 2, Apr. 2003, pp. 322-337.
Menon, Jai, et al., "IBM Storage Tank—A Heterogeneous Scalable SAN File System", IBM Systems Journal, vol. 42 No. 2, © 2003, pp. 250-267.
Rosenblum et al., "The Design and Implementation of a Log-Structured File System," *Operating Systems Review SIGOPS*, vol. 25, No. 5, New York, US, pp. 1-15 (May 1991).
Schultz, Nick, "QiNetix from CommVault", Computer Technology Review, Oct. I, 2002, one page.
Supplementary European Search Report for PCT/US2005/015202, dated Mar. 16, 2010, 3 pages.

* cited by examiner

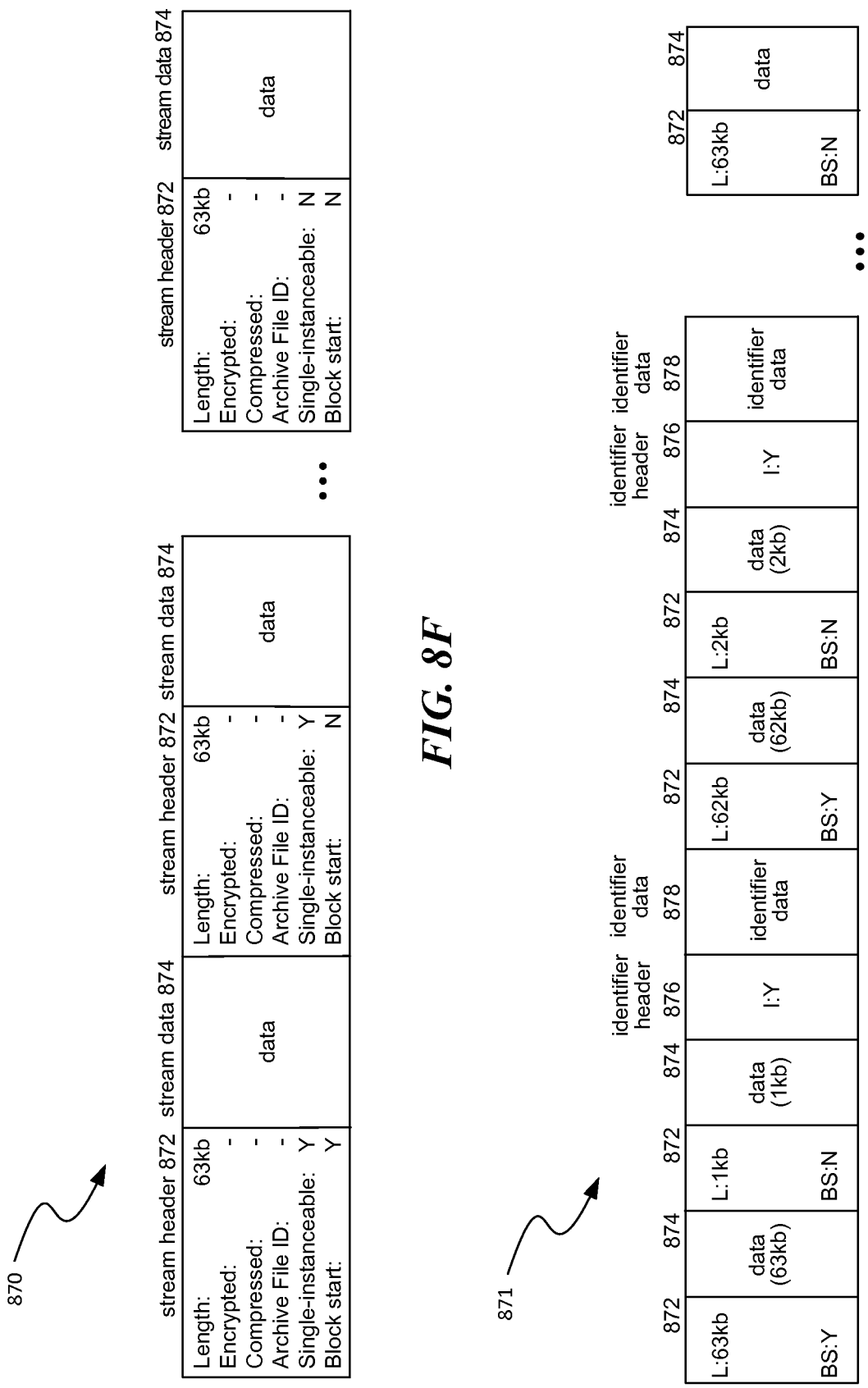

USER-CENTRIC INTERFACES FOR INFORMATION MANAGEMENT SYSTEMS

CROSS-REFERENCE TO RELATED APPLICATIONS

This application claims the benefit of the assignee's U.S. Provisional Patent Application No. 61/927,654, filed Jan. 15, 2014, hereby incorporated by reference herein.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems, such as databases, file servers, web servers, and so on, as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are increasing in demand.

BRIEF DESCRIPTION OF THE DRAWINGS

FIGS. 8F-8H are block diagrams illustrating suitable data structures that may be employed by the information management system.

DETAILED DESCRIPTION

Overview

Figure 1:
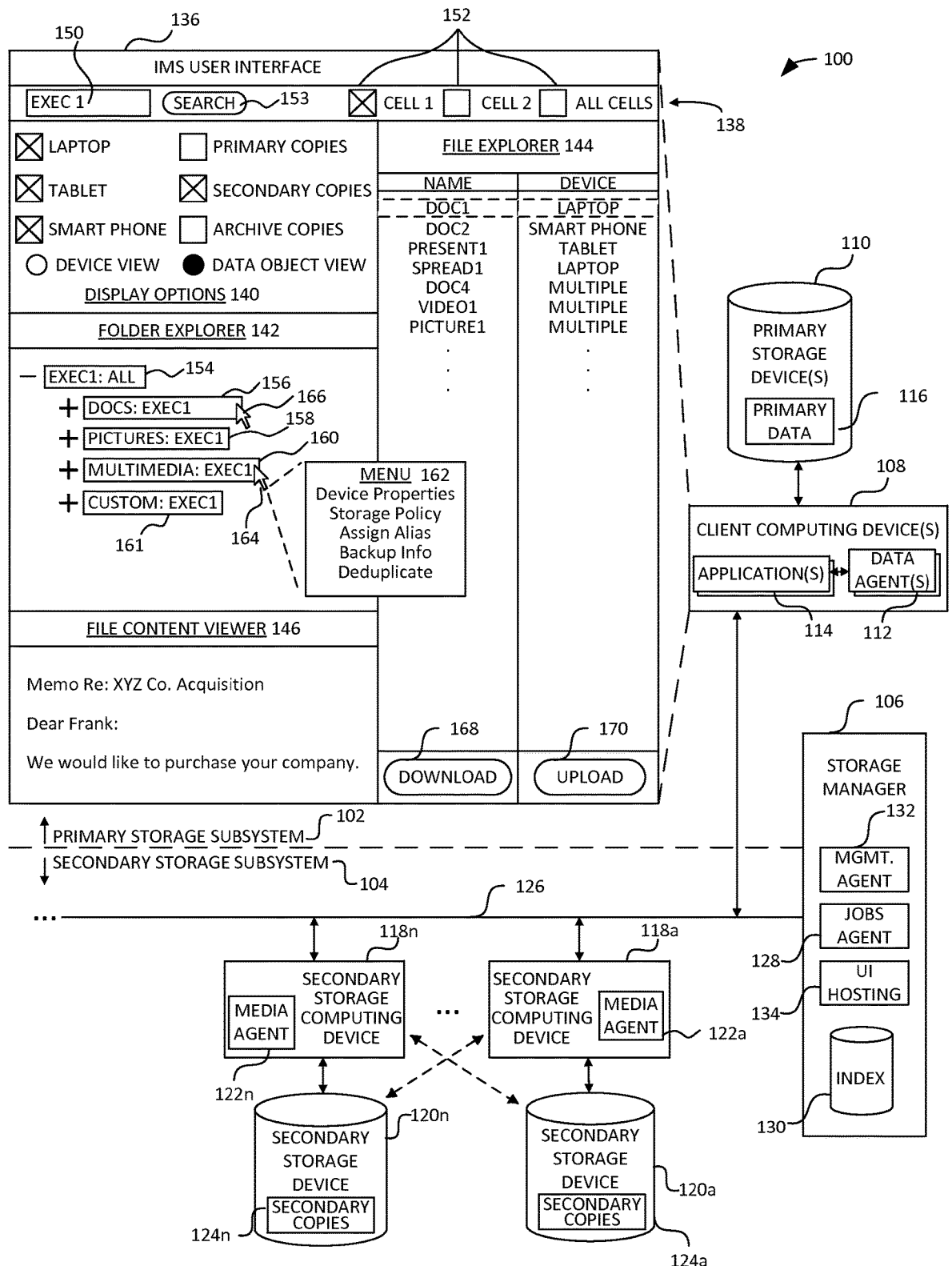
FIG. 1 is a block diagram illustrating one example of an information management system user interface.

With the increasing importance of protecting and leveraging data, organizations simply cannot afford to take the risk of losing critical data. Moreover, runaway data growth and other modern realities make protecting and managing data an increasingly difficult task, particularly when employees use multiple computing devices that each may modify an organization's documents. Therefore, there is a need for efficient, powerful, and user-friendly solutions for protecting and managing data.

At times, user-friendliness can be just as important to an end-user as the underlying features and functionality of information management system implementations. For example, consider a scenario that may occur during a product review procedure in a software company that specializes in information management systems, e.g., CommVault. The software company may include several teams distributed across various levels of managerial hierarchy to support the successful maintenance, development, and distribution of features or tools relating to the company's product line. The various levels of teams include developers, low-level management, mid-level management, and upper management. The developers regularly present or pitch new features, ideas, or potential product line functionalities to low-level and mid-level management. At times, the developers receive the opportunity to present new developments or ideas to upper management, such as the President and/or CEO, of the software company. The developers present new developments to upper management to receive feedback, recognition, and/or financial approval to continue pursuing development of a particular product or feature.

Feedback received from upper management may be useful for improving the user-friendless of the proposed new features. For example, developers of a user interface may present an idea to upper management related to enabling a user to browse files within an information management system, for a specific user. The user interface developers are, on a daily basis, submersed deeply into code, technical jargon, and machine names that may be relatively non-descriptive and/or meaningless to an average user, e.g., non-programmer. In contrast to the developer's daily focus, upper management's perspective on a user interface may be more aligned with the expectations and/or skill level of an average client or end-user. While impressed with the underlying functionality of the user interface presented by the developers, the general feedback from upper management may be to: 1) identify components displayed in the user interface more descriptively for the user: 2) provide access to all of the user's data in machine-agnostic and user-centric manner; and 3) provide administrator-like features to the user, enabling the user to manipulate his/her data via the user interface.

Implementation of the upper management's feedback may result in several advantages. For example, user-centric and machine agnostic implementation of the developer's idea may result in a product that is more appealing to non-enterprise users and enterprise users alike. As another example, extension of administrative features, e.g., deduplication and/or data storage policy manipulation, may be used to improve resource management, e.g., memory management.

Disclosed herein are systems and methods that provide a user-centric interface into an information management system that provides a unified view of all of a user's desired documents, despite being stored in multiple, different locations, including archived or backup locations. The user-centric interface enables the user, among other things, to search for and manipulate data objects that are associated with a particular user via a user-centric, rather than device-centric, interface. The user-centric interface also enables the user to perform administrator-like functions, such as deduplication, backup, and archiving, on various electronic devices associated with the user. In some embodiments, the user-centric interface provides these features to provide a machine-agnostic or machine-independent view of data objects associated with a user. Advantageously, the addition of user-centric features to an enterprise software product may increase the appeal and usability of the product to end-users.

The system provides a unified view of all of a user's documents or files, across all devices, where the devices have a user-friendly name (rather than logical pathnames or other unfriendly names not recognizable by most users). Any file and folder hierarchies are flattened out so that all of a user's desired documents are retrieved and displayed, regardless of which device they are stored on and in which folders on that device. Further, the system permits the display of secondary copies of data, which may be stored not on a user's device, but stored remotely and accessible by the device. The display of documents and files can be de-duplicated so that only one copy is shown, and if the user selects that copy, the most readily accessible one is retrieved.

Brief Information Management System Overview

FIG. 1 illustrates a user-centric interface within an information management system 100, according to one embodiment. The information management system 100 includes a variety of different computing devices. For instance, as will be described in greater detail herein, the information management system 100 may include a primary storage subsystem 102, a secondary storage subsystem 104, and a storage manager 106. Together, these components and systems enable users to create, store, and otherwise manage data objects associated with the user.

The primary storage subsystem 102 includes one or more client computing devices 108, communicatively coupled to one or more primary storage devices 110. The client computing device 108 can include any number of electronic computing devices, such as a desktop, laptop, tablet, smart phone, wearable device, or the like.

As illustrated, the client computing device 108 may include one or more data agents 112 configured to manage information generated by or through the use of one or more software applications 114 installed on, or accessible by, the client computing device 108. The data agent 112 communicates with the primary storage device 110, the storage manager 106, and components within the secondary storage system 104 to facilitate the manipulation and retention of primary data 116 that is located on the primary storage device 110.

Primary data 116, according to some embodiments, is production data or other "live" data generated by the operating system and other applications 114 residing on a client computing device 108. The primary data 116 is generally stored on the primary storage device(s) 110 and is organized via a file system supported by the client computing device 108. For instance, the client computing device(s) 108 and corresponding applications 114 may create, access, modify, write, delete, and otherwise use primary data 116. In some cases, some or all of the primary data 116 can be stored in cloud storage resources.

Primary data 116 is generally in the native format of the source application 114. According to certain aspects, primary data 116 is an initial or first (e.g., created before any other copies or before at least one other copy) stored copy of data generated by the source application 114. Primary data 116 in some cases is created substantially directly from data generated by the corresponding source applications 114.

The primary data 116 may sometimes be referred to as a "primary copy" in the sense that it is a discrete set of data. However, the use of this term does not necessarily imply that the "primary copy" is a copy in the sense that it was copied or otherwise derived from another stored version.

The primary storage device 110 can serve the storage needs of the client computing device 108 in any one of a number of storage device implementations. For example, the primary storage device 110 can be a mechanical or solid-state hard drive, a Network Accessible Storage device ("NAS"), or the like.

While the primary storage system 102 depicts a single client computing device 108 and a single primary storage device 110, the primary storage subsystem 102 can include tens, hundreds, or thousands of client computing devices 108 and primary storage devices 110. The primary storage subsystem 102 can represent some or all of the computing devices used to support productivity of a business, educational institution, or other organization valuing the protection, retention, and maintenance of electronically generated information.

Additional details regarding various exemplary embodiments of the components of the primary storage subsystem 102 are provided below in the discussion associated with FIGS. 8A-8H.

For recovery and/or regulatory compliance purposes, it may be useful to generate copies of the primary data 116. Accordingly, the secondary storage subsystem 104 includes one or more secondary storage computing devices 118 and one or more secondary storage devices 120 configured to create and store one or more secondary copies 124 (inclusive of copies 124a-124n) of the primary data 112 and associated metadata.

Creation of secondary copies 124 can help in search and analysis efforts and meet other information management goals, such as: restoring data and/or metadata if an original version (e.g., primary data 116) is lost by deletion, corruption, or other disaster; allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 108 access or receive primary data 116 and communicate the data, e.g., over the communication pathways 126, for storage in the secondary storage device(s) 120. The communication pathways 126 can include one or more intranets including local area networks, wide area networks, campus area networks, metropolitan area networks, and the like.

A secondary copy 124 can comprise a separate stored copy of application data that is derived from one or more earlier-created, stored copies (e.g., derived from primary data 116 or another secondary copy 124). Secondary copies 124 can include point-in-time data, and may be intended for relatively long-term retention (e.g., weeks, months or years), before some or all of the data is moved to other storage or is discarded.

In some implementations, secondary copies 124 can include shared copies of primary data 116. For example, the secondary copies 124 can be copies that are created, stored, managed, and/or modified using information sharing applications such as Box, Dropbox, Sharfile, Microsoft's SharePoint, or the like. Cloud-based solutions may also be employed for managing secondary copies 124. Thus, the secondary storage computing devices 118 and the secondary storage devices 120 can be configured to provide file sharing services, in addition to data storage and data retention services.

The secondary storage computing devices 118 provide an intermediary interface between the secondary storage devices 120 and other components of the information management system 100. Each secondary storage computing device 118 may be associated with or may include a media agent 122 to facilitate inter-component communications within the information management system 100. The media agent 122 is configured to communicate with the storage manager 106 and with the data agent 112 of the client computing device 108. The media agent 122 also interfaces with the secondary storage devices 124 to copy, read, analyze, transfer or otherwise manipulate secondary copies 124.

Additional details regarding various exemplary embodiments of the components of the secondary storage subsystem 104 are provided below in the discussion associated with FIGS. 8A-8H.

The storage manager 106 is a centralized storage and/or information manager that is configured to perform certain control functions. The storage manager 106 is communicatively coupled with the primary storage subsystem 102 and the secondary storage subsystem 104 via the communication channel(s) 126. The storage manager 106 facilitates transfer of data between the primary storage subsystem 102 and the secondary storage subsystem 104. For example, the storage manager 106 may instruct the data agent 112 to retrieve some or all of primary data 116. The storage manager 106 may then initiate communications between the data agent 112 and one or more media agents 122 to transfer some or all of the primary data 116 to one or more of the secondary storage devices 120. According to some embodiments, the storage manager 106 may employ a software module, such as a jobs agent 128, to initiate, facilitate, schedule, and otherwise manage communications between the data agent 112 and the media agents 122.

The storage manager 106 can be configured to support additional information management operations. For example, the storage manager 106 may include an index 130 or may interface with the index 130. The index 130 can be a database or other data structure that can be used to track and/or schedule information management policies, e.g., storage policies and retention policies. For example, each time the storage manager 106 executes a transfer of information from the primary storage subsystem 102 to the secondary storage subsystem 104, the storage manager 106 can update the index 130 to reflect the operation. The storage manager 106 can be configured to update the index 130 to reflect all information management operations that have occurred or that are scheduled to be executed in the information management system 100. For example, in accordance with a data retention policy, the jobs agent 128 may reference the index 130 prior to transferring a secondary copy 124 from one secondary storage computing device 120 to another slower and less costly secondary storage device 120.

The information management system 100 may constitute a single information management systems cell, e.g., Cell 1, of multiple information management system cells operated by a particular business, educational institution, or other organization. The storage manager 106 may include and utilize a management agent 132 to communicate with other similar storage managers of other information management system cells. When needed or requested, the storage manager 106 can acquire or can query other storage managers or other information management system cells for information satisfying the criteria of the queries. Upon receipt of information requested from other information management system cells, the storage manager 106 may update one or more databases, tables, data structures, or the like, e.g., the index 130.

While distributing functionality amongst multiple computing devices can have certain advantages, in other contexts it can be beneficial to consolidate functionality on the same computing device. As such, in various other embodiments, one or more of the components shown in FIG. 1 as being implemented on separate computing devices are implemented on the same computing device. In one configuration, a storage manager 106, one or more data agents 112, and one or more media agents 122 are all implemented on the same computing device. In another embodiment, one or more data agents 112 and one or more media agents 122 are implemented on the same computing device, while the storage manager 106 is implemented on a separate computing device.

The storage manager 106 may also be configured to enable users to manage, review, retrieve, delete, or otherwise manage data objects stored within the information management system 100. In one embodiment, the storage manager 106 includes a user interface hosting module 134 that may be used to provide various user interfaces for the information management system 100. The user interface hosting module 134 may enable the storage manager 106 to host interfaces for system administrators and provide administrative functionality to non-system administrative personnel. Administrative functions of a user interface for the information management system can include alert configurations, data storage and data retention policy configurations, deduplication of data objects, system security configurations, and the like. The non-system administrator functions that may typically be enabled in a user interface for an information management system include functions for retrieving, viewing and restoring data objects associated with a particular user. An example of a user-friendly and user-centric interface (versus a system administrator-oriented interface) is represented as Information Management System user interface 136 ("IMS user interface 136").

User-Centric Interface

The IMS user interface 136 is a web-based interface for the information management system 100 that is hosted by storage manager 106, in accordance with an embodiment. Although illustrated as being accessed by the client computing device 108, the IMS user interface 136 may be accessible from any computing device that may establish communications with the storage manager 106. In some embodiments, only computing devices with access privileges to the information management system 100 may establish communications with the storage manager 106. Briefly referencing the introductory scenario regarding upper-level management feedback on a user interface, the IMS user interface 136 represents an implementation of an interface that enables users to conveniently interact with data objects in a user-centric manner.

According to various embodiments, data objects stored within the information management system 100 are associated with a particular user in multiple ways. In some ways, data objects are associated with the user when the data objects are created, modified, read, accessed, or otherwise modified on or by an electronic computing device that has been assigned to the particular user or the particular user's username. In other embodiments, data objects are associated with the user if or when the user's username is determined as having created, reviewed, modified, accessed, or otherwise manipulated a particular data object, independent of the particular hardware that the username is logged into.

Because the IMS user interface 136 is hosted by the storage manager 106, the storage manager 106 may utilize the user interface hosting agent 134 to populate the IMS user interface 136 with information from and/or about the information management system 100. For example, the storage manager 106 may use historical information management operations information that is stored in the index 130 to populate the IMS user interface 136 with details about data objects in the information management system 100. For instance, the IMS user interface 136 can be used to display and manage data objects originating from any client computing device(s) 108, and versions of the data objects that have been transferred to locations within the secondary storage system 104.

The IMS user interface 136 includes various windows or sections to facilitate the user's interaction with the information management system 100, or with the data objects managed by the information management system 100. According to various embodiments, the IMS user interface 136 may include a search window 138, a display options window 140, a folder explorer window 142, a file explorer window 144, and a file content viewer 146.

The search window 138 enables a user to define coarse search parameters for data objects in the information management system 100. The search window 138 may include, among other search parameters or criteria, selection elements for information management system cells 152 and a text box 150.

As discussed above, the information management system 100 may constitute one information management system cell, e.g., CELL 1, out of or among several information management system cells, e.g., ALL CELLS. The search window 138 may include check boxes 152, a drop-down menu, or other graphical user interface object to allow the user to select one or more of the information management system cells to search within. A particular user may have generated or electronically "touched" data objects that are distributed within more than one information management system cell. For example, if a software company has one office in New Jersey and another office in India, the software company may employ a different instance of the information management system 100 for each corporate location. If a developer of the software company generates data objects while working from the New Jersey branch of the software company and generates data objects while working from the India office of the company, the developer will have data objects associated with his/her laptop and/or username in multiple information management system cells. Therefore, a feature such as check boxes 152 can allow a user to better perform a user-centric search for data objects associated with that user by allowing the user to include some or all information management cells.

The search window 138 may also include a text box 150 and a search button 153 to allow a user to further define search criteria for data objects in the information management system 100. The user can enter a user's name, e.g., John Smith, a job title, e.g., CEO, or a username, e.g., Exec1, with which to search for data objects within the information management system 100. In other embodiments, the text box 150 can be a drop-down menu that includes every name and/or username within the organization associated with the information management system 100.

Upon execution of the coarse search parameters entered into the search window 138, the user interface hosting module 134 may query the index 130 to retrieve search results. The index 130 may include metadata describing all information management operations for the information management system 100. Thus, the storage manager 106 may fulfill a coarse search of the information management system 100 using information contained in the index 130. Additionally, the storage manager 106 may transmit one or more queries to storage managers of other information management system cells, to fulfill search requests based on the contents of other information management system cells.

The storage manager 106 may update the index 130 to reflect content indexing and data classification of data objects during information management operations. During content indexing and data classification, the storage manager 106 may save metadata and keywords related to the content of the data objects of the primary data 116 and secondary copies 124 in the index 130. The storage manager may automatically index all data objects in certain predetermined folders or libraries on a user's devices, e.g. in Documents, Music, Pictures and Videos libraries for devices running Microsoft Windows. The storage manager 106 may also store other related metadata in the index 130, to associate secondary copies, auxiliary copies, archived copies, and the like, with their related keywords and metadata that was generated during content indexing and data classification operations. The keywords and/or metadata may be used to perform searches based on words in the content of data objects, data object names, data object path names, one or more folder names under which a data object is organized, file extensions for data objects, and/or identification of an application associated with the data objects. By capturing keywords and other metadata associated with each data object, the storage manager 106 may be configured to automatically identify which folder or which type of folder (e.g., Pictures, Videos, Library, personal) the data object is organized under or associated with. In response to the search criteria received by the IMS user interface 136, the storage manager may rely on metadata and keywords stored in the index 130 to fulfill the received query. These keywords and metadata may be used to populate the folder explore window 142, the file explorer window 144, and the file content viewer 146, which will be discussed in more detailed below.

The display options window 140 can be used to limit the number of results viewed by the user or can be used to further narrow the scope of the search performed by the storage manager 106. In other words, after the storage manager 106 has searched, e.g., CELL 1, for data objects associated with a username, e.g., Exec1, the storage manager 106 can return all results. From these results, the user can quickly adjust which results are displayed using the options provided in the display options window 140. Some of the options that may be available in the display options window 140 include identification of sources of the data objects, such as a user's laptop, a user's tablet, and a user's smartphone. Other options may include logical locations or types of data objects, such as primary data, secondary copies, and archive copies. The display options window 140 may also enable a user to search or filter results based on file extensions, folder names, file names, path names, or application name/type, e.g., Sharefile, Dropbox, Box, SharePoint, word processor, web browser. The user may also select from a data object view of the search results, or a device view of the search results (shown in FIG. 3). In some embodiments, the options in the display options window 140 are parameters used by the storage manager 106 while querying the index 130. Searching a narrower scope may advantageously decrease the time needed to complete the data object search.

The folder explorer window 142 provides additional options to the user for managing data objects with the IMS user interface 136. For example, in the hierarchical tree of folders displayed in the folder explorer window 142, the user may select a folder 154 to display all data objects returned by the search parameters. IMS user interface 136 may display data object file names in the file explorer window 144. The folder explorer window 142 also enables a user to select between subfolders of the folder 154. Example subfolders that categorize all of the users' data objects may include a documents folder 156, a pictures folder 158, and a multimedia folder 160. As illustrated, each of these folders may be identified with search criteria or the username that was searched, e.g. "Exec1". These folders may be associated with data objects that have metadata (e.g., folder names, path names, file names) or that include content that corresponds with or that matches the folder name or folder type displayed in the folder explorer window 142. These folders may also include subfolders that identify a specific device associated with the user, or include subfolders that further categorize the returned data objects, e.g., by file extension, date, size, additional search criteria, etc.

In some implementations, the folder explorer window 142 includes one or more custom folders 161 that can be named by the user and that can be associated with specific search criteria. Similar to the other folders displayed in the folder explorer window 142, the custom folder 161 may be named, in whole or in part, based on the search criteria. For example, the custom folder 161 may be named to identify the user who performed the search, such as Exec1. The custom folder 161 may also be configured to be associated with user-defined search criteria, such as specific file extensions, data types (e.g., personal), keywords in data object content, keywords in data object names, keywords in all or part of a data object's file system path name, or the like. The custom folder 161 may also be a node in a tree directory that can be expanded to provide more granular categorization of data objects, e.g., by primary device, by secondary device, by version, by modification data and/or time, by file type, etc.

As described herein, the information management system can backup or make secondary copies of data objects or files from various user devices, such as a user's one or more smart phones, laptops, etc. The system can automatically synchronize the backup of data objects or files that are in default folders or libraries, such as the Documents, Videos, Music and Pictures libraries in Microsoft Windows. The system can thus automatically synchronize and backup data objects from these default folders or libraries to secondary storage. Furthermore, the system can allow a user to select particular folders or libraries to synchronize and backup to secondary storage. The system likewise indexes all data objects from these files or libraries, such as when these data objects are copied to secondary storage. This index can then be used to populate the data objects displayed to the user, as described herein. Furthermore, while focused on indexing data objects in secondary storage, the system can likewise access the file system for primary or "live" data stored on the user's devices, so that this data can likewise be displayed to the user in response to searches.

The custom folder 161 can be configured to synchronize with the content one or more specific folders of a user's device or devices. For example, the custom folder 161 can be configured to synchronize with data objects in a particular folder of the user's laptop in addition to a particular folder of the user's smart phone. This may be performed by configuring the storage manager 106 to automatically index and aggregate the content of a particular folder, of a client computing device 108, that is selected by a user for backup. Thus, the folders depicted in the folder explorer window 142 can represent standard default folders from a particular operating system, can represent a particular folder that is selected for backup, and/or can represent an aggregation of multiple folders specified by the user for synchronization, on one or more client computing devices 108.

Clicking the individual folders or otherwise selecting the individual folders 154-160 can be used to generate a menu 162 or can be used to populate the file explorer window 144 with data object names that correspond with the selected folder(s). For example, if a user selects the multimedia folder 160 with cursor 164, e.g., using a mouse "right-click", the IMS user interface 136 may display a menu 162. The menu 162 may provide options to a user that are generally limited to users having system administrator privileges within the information management system 100. For example, the menu 162 may provide the user with options to deduplicate the data objects associated with a particular folder. The option to deduplicate data objects is described in more detail below in the discussion related to FIG. 3. Additionally, the menu 162 may provide the user with options to modify a storage policy associated with the data objects within a particular folder. The storage policy modification option is described in more detail below in the discussion related to FIG. 5.

The storage manager 106 may be configured to respond to selection of a folder in the folder explorer window 142 by populating the file explorer window 144 with data object names. For example, if the cursor 166 is used to select the documents folder 156, e.g., via a mouse "left-click", the storage manager 106 may populate the file explorer window 144 with a list of names of all data objects that satisfy the search criteria entered in the search window 138 and the display options window 140, and that are associated with the selected folder.

The file explorer window 144 lists the data objects associated with the folder selected in the folder explorer 142 and can be used to modify the listed data objects. In the illustrated example of the contents of the EXEC1:ALL folder 154, data objects "DOC1", "DOC2", "PRESENT1", "SPREAD1", "DOC4", "VIDEO1", and "PICTURE1" are listed beside their corresponding source devices, i.e., "LAPTOP", "SMART PHONE", "TABLET", "LAPTOP", "MULTIPLE", "MULTIPLE", and "MULTIPLE", respectively. For ease in understanding by a user, the source device names may be simplified aliases for functional machine names or logical path names assigned to the devices by the information management system 100. The user may assign aliases for their devices via a system interface (not shown) or the system may automatically provide them, either retrieving them from the device (e.g. a device name that the user has previously provided to the device like a smart phone) or the system determines the type of device (possibly dropping any model numbers) and then appends the user's given name to the type of device (e.g. "Bob's_MacBook").

In the illustrated example of the file explorer window 144, a source device identifier is listed for each of the data objects. However, the data object may have originated from the identified source device and may have subsequently been relocated within the information management system 100. For example, each data object named in the file explorer window 144 may be stored on the secondary storage devices 120, may be archived, and/or may reside locally on one or more client computing devices 108. Regardless of the data object's present storage location, the source device indication provides the user with additional information about the origin of the data object, and the interface 136 can display the files, regardless of their various locations.

Each of data objects named in the file explorer window 144 may also have one or more versions distributed throughout the information management system 100, although only one data object may be named in the file explorer window 144. In some implementations, in response to selection of a menu item or in response to selecting a data object in the file explorer window 144, a user may choose to display all versions of a named data object in the file explorer window 144. The IMS user interface 136 may enable a user to more specifically view or select a data object by providing the version history of the data objects, e.g., information about the modification dates and/or times for each version.

The file explorer window 144 simplifies data object navigation by showing a single instance of duplicate data objects. For example, copies of data object "DOC1" may exist in one or more secondary storage devices 120, in addition to the laptop client computing device 108. For ease of use and navigation, the file explorer window 144 may be configured to display a consolidated name or single instance representation of the data object "DOC1", as shown. The file explorer window 144 can then be configured to enable browsing or manipulation of particular instances of a data object, e.g., through one or more menus, by selection of the consolidated name for the data object.

The file explorer window 144 can also simplify data object navigation for data objects that originate from multiple client devices 108. The data objects "DOC4", "VIDEO1", and "PICTURE1" are data objects that have multiple source devices, e.g., copies of the data object presently exist or previously existed on more than one source device. The file explorer window 144 can notify the user of a multi-device origination of a data object using the identifier "MULTIPLE". This multi-device identifier can represent that data object copies have multiple instances in either or both of the primary storage subsystem 102 and the secondary storage subsystem 104. The file explorer window 144 can simplify or flatten out the file system hierarchy of data object duplications by showing a single instance representation of duplicate data objects, independent of where the data object duplicates currently reside within the primary storage system 102 or the secondary storage subsystem 104. Additional features related to deduplication and display of duplicate data objects is provided in the discussion related to FIG. 3.

As an example, the data object DOC1 may be stored within a sub-sub folder, but the folder hierarchy is not displayed to the user. When multiple copies or versions of the same file or document exist (e.g. DOC4), the system may keep all copies, but only show one copy so that the system does not display multiple copies of the same document. The user may then expand or right-click on the file or document to show all copies and where those copies are located (on which devices and/or via which path names). Thus, the system provides a unified view across all devices, with drill down ability to see how many copies of a file exist, and on which devices, including all secondary copies.

In other embodiments, more or less information could be included in the file explorer window 144. For example, rather than just listing the device that is the source of the data object, the file explorer window 144 can also be configured to list the current location of the data object within the information management system 100. For example, although the data objects named DOC1 and SPREAD1 originate from the user's laptop, the present location of DOC1 could be the primary storage device 110, while the present location of the data object named SPREAD1 could be the secondary storage device 120n. Additional data object information displayed in the filed explorer 144 may, according to various implementations, include source device machine name, information related to creation, transfer to secondary storage, transition to archive copy, deletion, classification of content, keywords, and the like.

The file explorer window 144 can enable users to modify one or more of the listed data objects with the download button 168 and the upload button 170. Because each of the data objects can be located in any one of a number of places within the information management system 100, a user-friendly implementation of the IMS user interface 136 allows the user to select a data object of interest, download the data object using the download button 168, and after modifications are made to the locally stored data object copy, upload the modified data object using the upload button 170. In one embodiment, after the modified data object is uploaded by the IMS user interface 136, the storage manager 106 transfers the modified data object into the same primary or secondary storage device from which the data object was downloaded. In other embodiments, the storage manager 132 deletes or overwrites the downloaded version of the data object and stores the modified data object in its place.

The storage manager 106 may be able to populate responses to queries from the IMS user interface 136 more quickly if relying on metadata and other information stored in the index 130 or in other indexes or databases, rather than fetching the actual data object listed in the file explorer window 144. However, the IMS user interface 136 can be used to view all or portions of the data objects, in some implementations of IMS user interface 136. The storage manager 106 can populate the file content viewer 146 with some or all of the contents of a data object selected in the file explorer 144. For example, upon selection of the data object named DOC1, the storage manager 106 may display, e.g., contents of a memo regarding the acquisition of a company, XYZ Co. While the storage manager 106 can be configured to display the contents of the data object in the file content viewer 146, retrieving the data object from its storage location may result in a delay between the time the data object is selected in the file explorer window 144 and the time that the contents of the data object are actually displayed in the file content viewer 146. However, because the storage manager 106 stores, or can store, the location of each data object in the index 130, retrieval of the contents of a data object via the IMS user interface 136 is faster than manually browsing, e.g., using Microsoft Windows Explorer, through the contents of one of the primary storage devices 110 or one of the secondary storage devices 120.

When a user selects a data object for viewing which has duplicates, the storage manager 106 may use one of a variety of techniques for displaying data object content in the file content view 146. In some implementations, the storage manager 106 retrieves content of the data object located in the primary storage subsystem 102 prior to attempting to retrieve content from the secondary storage subsystem 104. In other implementations, the storage manager 106 determines the fastest of the several storage media that are storing duplicate copies of a data object, and retrieves the content of the duplicate data object from the fastest storage media (e.g. preferring geographically closer, online copies stored on disk versus copies on tape stored in a more remote location).

By hosting the IMS user interface 136 with the user interface hosting module 134, the storage manager 106 provides a user-centric interface that is user-friendly and that has various commercially valuable advantages or uses. For example, in one embodiment, the IMS user interface 136 can be used to evaluate employees' downloads and deletions of data objects to determine whether employees are making appropriate use of company resources. In another embodiment, the IMS user interface 136 can be used to comply with the discovery requests by fetching and downloading all data objects associated with a particular user or all data objects having specific content. In some embodiments of the IMS user interface 136, data objects in the file explorer window 144 or folders displayed in the folder explorer window 142 can be selected and locked from future deletion, i.e., an e-discovery lock. Additionally, as discussed above briefly, features that are typically reserved for system administrators, such as deduplication and storage policy configurations, may be extended to end-users in an intuitive and user-friendly manner.

Figure 2:
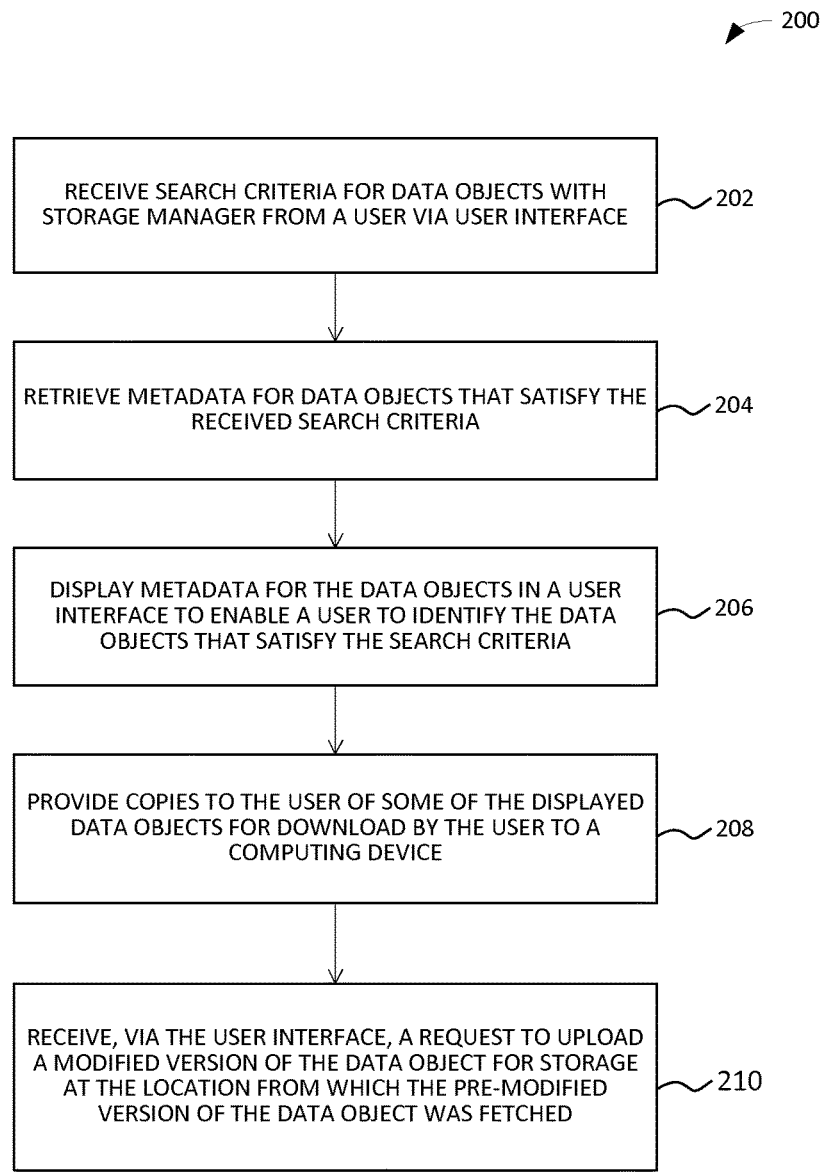
FIG. 2 is a flow diagram illustrating a method of providing an information management system interface.

FIG. 2 illustrates a flow diagram for enabling a user to modify data objects that are stored somewhere within the information management system 100.

At block 202, a storage manager generates a user interface by which to receive search criteria for data objects from a user. (Alternatively or additionally, the user interface may be stored or generated locally on a client device, such as a mobile device.) The search criteria can include parameters such as which information management system cell to search, keywords, a source of the data objects, and/or the present location or storage format of the data objects.

The storage manager may be configured to extend administrative privileges to the user within the information management system to allow the user to manage personal data. For example, as discussed above, and described in more detail below, the storage manager grant the user privileges related to deduplicating data objects, modifying data storage policies, and modifying data retention policies for data that has been tagged, e.g., "personal", by the user or by the information management system (e.g. data from or associated with social media sites). Concurrently, the storage manager may prohibit the user from performing administrative operations on data objects that are identified by the information management system as non-personal. For example, the information management system may tag all data objects having the word "confidential", "work", or the company's name as non-personal. The storage manager may automatically filter non-personal data objects from being displayed to a user for personal management. In some implementations, the storage manager may display all data objects that meet a particular search criteria, but may decline requests for administrative operations, e.g., deduplication, of non-personal data.

At block 204, the storage manager retrieves metadata related to data objects that satisfy the received search criteria. The metadata may be stored in an index or database associated with or included in the storage manager. The storage manager may be configured to fetch metadata related to data objects from other information management system cells to satisfy the received search criteria.

At block 206, the storage manager populates one or more windows of the user interface with metadata, e.g., file names, of data objects that satisfy the search criteria. In particular, the storage manager may populate the windows with metadata that enables the user to identify a particular data object, e.g., a name of the file, device from which the file was generated, classification of the content of the object, or the like. By enabling the user to retrieve and view identifiers for the data objects, the user can select one or more data objects for modification.

Table 1 (shown below) illustrates an example of a data structure that the storage manager may use to associate user-friendly names or alias with a particular device. Often, an organization may have multiple individuals with the same name, such as John, so an information management system may not effectively rely on user-friendly names while executing administrative operations. Table 1 includes a column of machine

TABLE 1

| Machine Name | User-friendly Alias |
| --- | --- |
| Alpha1.LPT.Robert.ASDF | Bob's Laptop |
| Alpha1.SmrtPhn.Personal.Ntwk12 | My Phone |
| Extrnl.Tblt.3214xy.Ntwk4 | Work Tablet |
| Bravo1.DSKTP.Bldg2.Ntwk2 | Jack's Computer | names and a column of corresponding user-friendly aliases. The storage manager may use the machine name to perform search and retrieval operations while displaying the user-friendly alias in the user interface.

At block 208, the storage manager receives a request from the user, via the user interface, to retrieve one or more data objects associated with the metadata displayed by the user interface. The storage manager can use locations of the data objects that are stored in a storage manager index or media agent index to fetch the data objects requested with the user interface from the various locations at which they are stored, and provide the data objects to the computing device from which the request was made. Once downloaded, the user can review, modify and save the data object locally. However, a user may want to transfer the modified copy to secondary storage, or may want to replace the unmodified version of the data object with the modified version of the data object.

At block 210, the storage manager receives, via the user interface, a request to upload a modified version of the data object. The storage manager transfers the modified data object to the storage device from which the unmodified data object was fetched by communicating with either a data agent, media agent, or a management agent to coordinate the transfer. The modified version of the data object, according to various embodiments, may be transferred and saved in the location from which the data object was fetched. If duplicates of an object exist throughout the information management system 100, the storage manager can be configured to save the modified version of the data object at all of the locations of the unmodified version of the data object.

Alternatively, the storage manager can be configured to replace all of the unmodified duplicates of the data object with the modified version of the data object so that future data recoveries are performed with the modified version of the data object.

Figure 3:
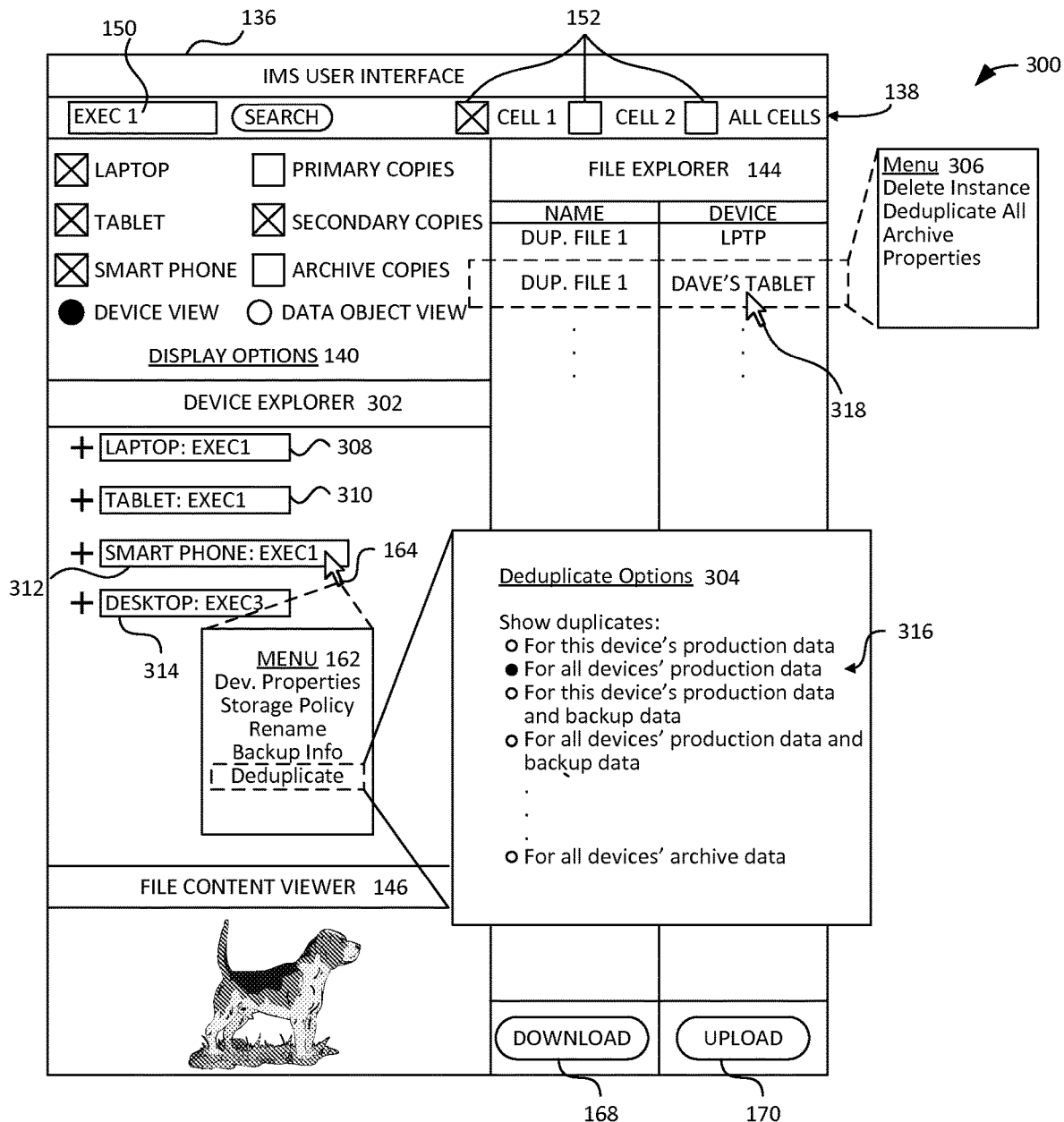
FIG. 3 is a detailed view illustrating an example of an instance of an information management system user interface for deduplicating data objects.

FIG. 3 illustrates an instance 300 of the IMS user interface 136 to show additional features that may be available to the user through the IMS user interface 136. In particular, the instance 300 shows that the IMS user interface 136 may also include a device explorer 302, a deduplicate menu 304, and deduplicate menu 306. Although the deduplicate menu 304 and duplicate menu 306 are illustrated herein with the IMS user interface 136 in device view mode, these menus can also be applied to the IMS user interface 136 while in data object view, as illustrated in FIG. 1.

The IMS user interface 136 may display the device explorer menu 302 in response to a device view selection by the user in display options window 140. The device explorer window 302 may display several folders or other graphical objects in a hierarchical tree or other menu format to show the devices that are associated with the user or username entered into text box 150. For example, the device explorer window 302 may display a laptop folder 308, a tablet folder 310, and a smart phone folder 312. Each of the device folders 308-312 include a generic description of the device type and the username or user's name searched in the search window 138.

In some embodiments, a device that does not belong to the user of the search will also be displayed in device explorer 302. Devices that are not assigned to the user may be displayed in the device explorer window 302 if the user has created, viewed, modified, or deleted one or more data objects from another device within the information management system 100. For example, the user "Exec1" may have logged into another member of upper management's desktop computer, e.g., Exec3's desktop, and generated, viewed, modified, or accessed data objects while logged in as under the username "Exec1". Accordingly, the device explorer window 302 may also display a device folder 314 described as a desktop for the user "Exec3".

The option to deduplicate one more files, folders, or storage devices is historically reserved for users having system administrator access rights or privileges. However, in some implementations of the IMS user interface 136, the access rights to show and manage duplicate data objects may be extended to any user of the IMS user interface 136 regardless of assigned administrative privileges within the information management system 100. Such a feature may have commercial value when extended to the general public, e.g., non-enterprise users, because it may offer more efficient and greater control and management of memory usage in consumer electronics. For example, a user may have photos of a vacation stored on a tablet device, smart phone device, and a network attached storage device. Using deduplication, the user may choose to retain the pictures on the tablet device, to show the pictures to friends and family, while removing duplicates from the smart phone to reduce memory consumption. The user may also choose to retain the duplicates on the network attached storage device for disaster recovery or long term storage.

The IMS user interface 136 can be configured to display the deduplicate menu 304 in response to selection of the deduplicate option from menu 162. As discussed in connection with FIG. 1, the IMS user interface 136 can be configured to generate the menu 162 in response to selection of a folder in the device explorer window 302 or in the folder explorer window 142.

The deduplicate menu 304 can include multiple options for displaying duplicates in the file explorer 144. Examples of deduplicate options include showing duplicates for: a single device's production data; all devices' production data; a single device's production data combined with backup data; all devices' production data and backup data; a single device's archived data; all devices' archived data; and any combination of the foregoing. If, for example, the user selects option 316, the IMS user interface 136 can populate the file explorer 144 with all duplicate data objects from the primary storage devices 110 (shown in FIG. 1) associated with all of the devices displayed in the device explorer window 302 and associated with the username or other related search criteria.

Duplicate data objects displayed in the file explorer window 144 may be determined to be duplicates based on the content of the data objects, without regard for the metadata associated with the data objects. The objects displayed in the file explorer window 144 may have the same name, may have different names, may have originated from the same device, may have originated from different devices, or any combination thereof. Generally, a hash operation or other encryption function can be applied to a data object to generate a signature that is unique to a particular object. The storage manager 106 or other computing device may then compare the generated signatures to determine if the contents of the data objects are the same, independent of the names of the data objects. However, if metadata, e.g., a file name, creation time, or modification time, associated with data objects is used in the determination of the unique signature, then two objects having the same content and different metadata may not be identified as duplicates. Therefore, in accordance with one embodiment, the IMS user interface 136 displays data objects in the file explorer window 144 that have been determined to be duplicates based only on a comparison of the content of the data objects, omitting comparisons of metadata associated with the data objects.

The IMS user interface 136 can be configured to display the deduplicate menu 306 in response to selection of one or more data objects displayed within the file explorer window 144. The deduplication menu 306 can include numerous options to facilitate deduplication of the data object of a particular device, or deduplication of all devices associated with a user. For example, the deduplication menu 306 may include options for deleting an instance of a duplicate data object, deduplicating or deleting all duplicate instances of a data object, archiving or backing up a particular duplicate data object, and/or viewing properties associated with a duplicate data object. By displaying the properties of the data object, the IMS user interface 136 may enable a user to determine or view other data or metadata associated with the data object, such as creation date, present location of the data object, backup date, archived date, size, and the like.

In one implementation, selection of the data object, e.g., via a "left-click" of the cursor 318, causes the IMS user interface 136 to display the contents of the data object in the file content viewer 146. As shown, in some embodiments the data object, e.g., "DUP. FILE 1", may be a picture of a user's dog that the user stored on his/her tablet. In response to selection of a data object from the file explorer 144 for viewing in the file content view 146, the storage manager 106 may have to first retrieve contents of the data object from primary storage devices 110 or secondary storage devices 120, using information stored in one or more information management databases, e.g., index 130.

The ability of a user to deduplicate data objects associated with or located on multiple devices can provide several advantages to a user. For example, enabling a user to visually confirm that data objects on his/her tablet device are duplicated in a backup storage device can allow the user to rest assure that certain data objects are less likely to be lost, or that certain data objects are protected. As another example, by displaying all duplicates associated with a particular device, associated with all devices, associated with production data, or associated with production data and secondary copies, a user can make an informed decision about where the user can free up or reduce memory usage without the loss of particular data objects.

Figure 4:
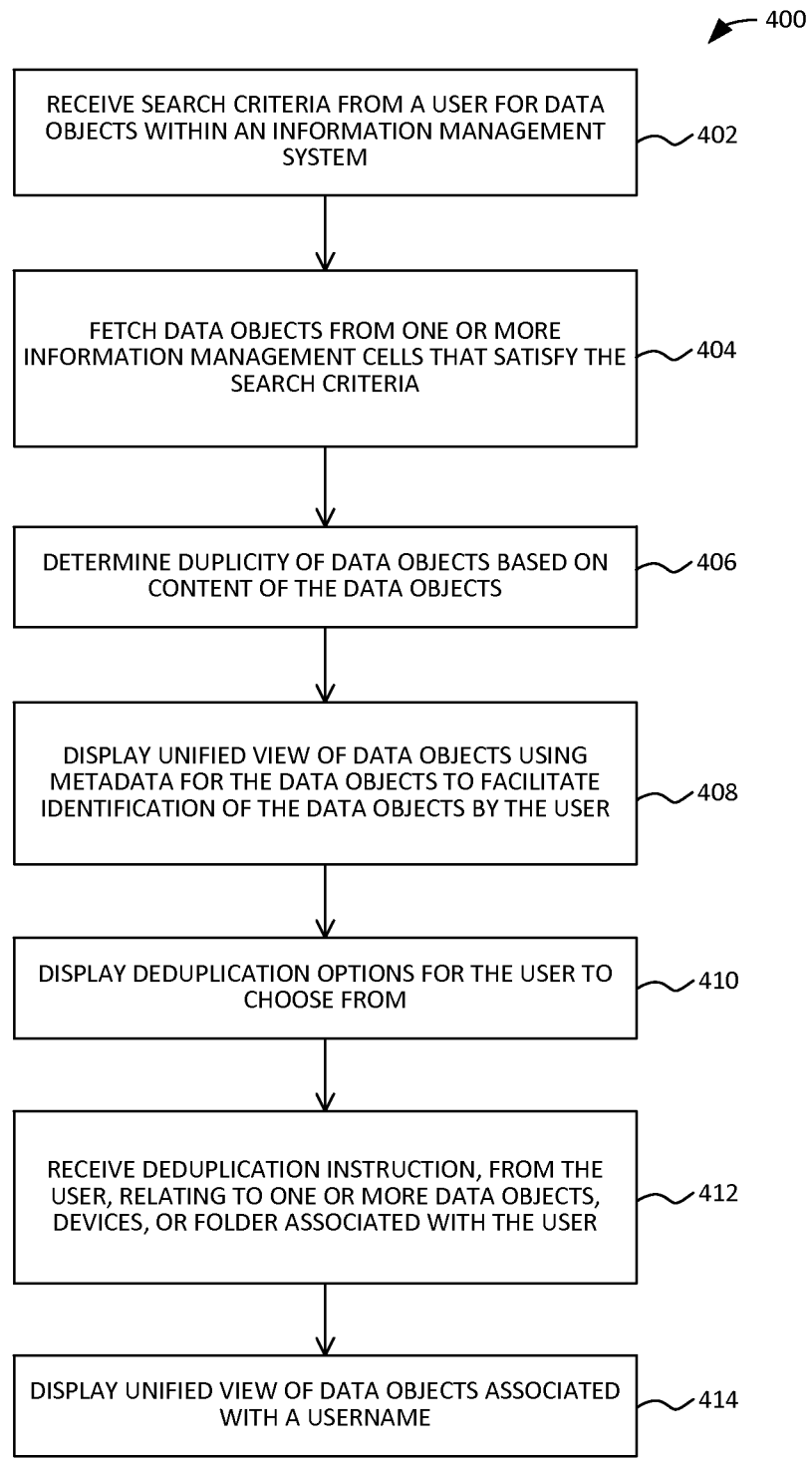
FIG. 4 is a flow diagram illustrating a method of providing deduplication features in an information management system user interface.

FIG. 4 illustrates a method 400 for providing deduplication options to a user via a user interface. As discussed above, the ability to deduplicate data objects associated with a user can provide advantages related to security and memory usage management.

At block 402, a computing device receives search criteria from a user. The search criteria can include username, information management system cell selection, particular devices, types of data objects, locations of data objects, and the like. The search criteria define the scope of search that the computing device will perform.

At block 404, the computing device fetches metadata for all data objects that satisfy the received search criteria. The computing device may be able to fetch the requested data object metadata from a single information management system cell or may need to communicate with other information management system cells to acquire the desired data object metadata from numerous data storage locations. At the expense of more time-consuming searches, the computing device can be configured to fetch copies of the data object content from one or more storage devices in the information management system. However, to provide more responsive search results, the computing device may be configured to simply retrieve metadata for the data objects that satisfy the search criteria. In some embodiments, the information management system creates a unique signature, e.g., via a hash function, of some or all data objects that are transferred from a primary storage device to a secondary storage device. The computing device, e.g., storage manager, then stores the signature or signature of the content of the data object, in a database, data structure, or index associated with the computing device. This will enable the computing device to reduce delays associated with populating the user interface with deduplication information for data objects that satisfy the user's search criteria.

At block 406, the computing device determines which data objects are duplicates of each other based on the content of the data objects. In some embodiments, the computing device determines data object duplication using both metadata and content of the data object. In other embodiments, the computing device only uses content of the data object to determine duplicity of data objects. As discussed above, the device may calculate signatures (e.g., hashes or cryptographically unique IDs) corresponding to the contents of each data object. The computing device can then compare signatures of contents of the data objects to determine which data objects have content that is duplicative of other data objects.

At block 408, the computing device displays metadata identifying duplicate data objects in a user interface. For example, the computing device may display names of the data objects, creation dates, source devices, current locations, type of data objects, or the like, for viewing by the user. By displaying metadata associated with the data objects, the computing device can provide a unified view of the data objects in the user interface. The unified view of the data can enable the user to consider, view, or manage all of his/her data without having to concern himself with the particular device or without having to search through subdirectories of a particular device to identify data objects of interest. In other words, hierarchies of data storage are flattened for ease of viewing by a user.

At block 410, the computing device can provide the user with various deduplication options for deduplicating data objects fetched by the computing device. The computing device may provide these options to the user via a series of menus from which the user may select through the user interface. The options may include deletion, archiving, or displaying further properties of the duplicate data object, according to one embodiment.

At block 412, the computing device may receive deduplication instructions from the user via the user interface. These deduplication instructions can include, for example, removal of a particular duplicate data object, deletion of all duplicates of the particular data object, deduplication of an entire folder or device, and/or deduplication of all devices associated with a user and satisfying search criteria defined by the user.

At block 414, the computing device can execute the requested deduplication operations in one or more information management system cells. The computing device can perform these deduplication functions by communicating with one or more data agents, media agents, and job agents in the information management system. Further details regarding exemplary methods of deduplication and components used in deduplication procedures are described below in the description associated with FIGS. 8A-8H.

Figure 5:
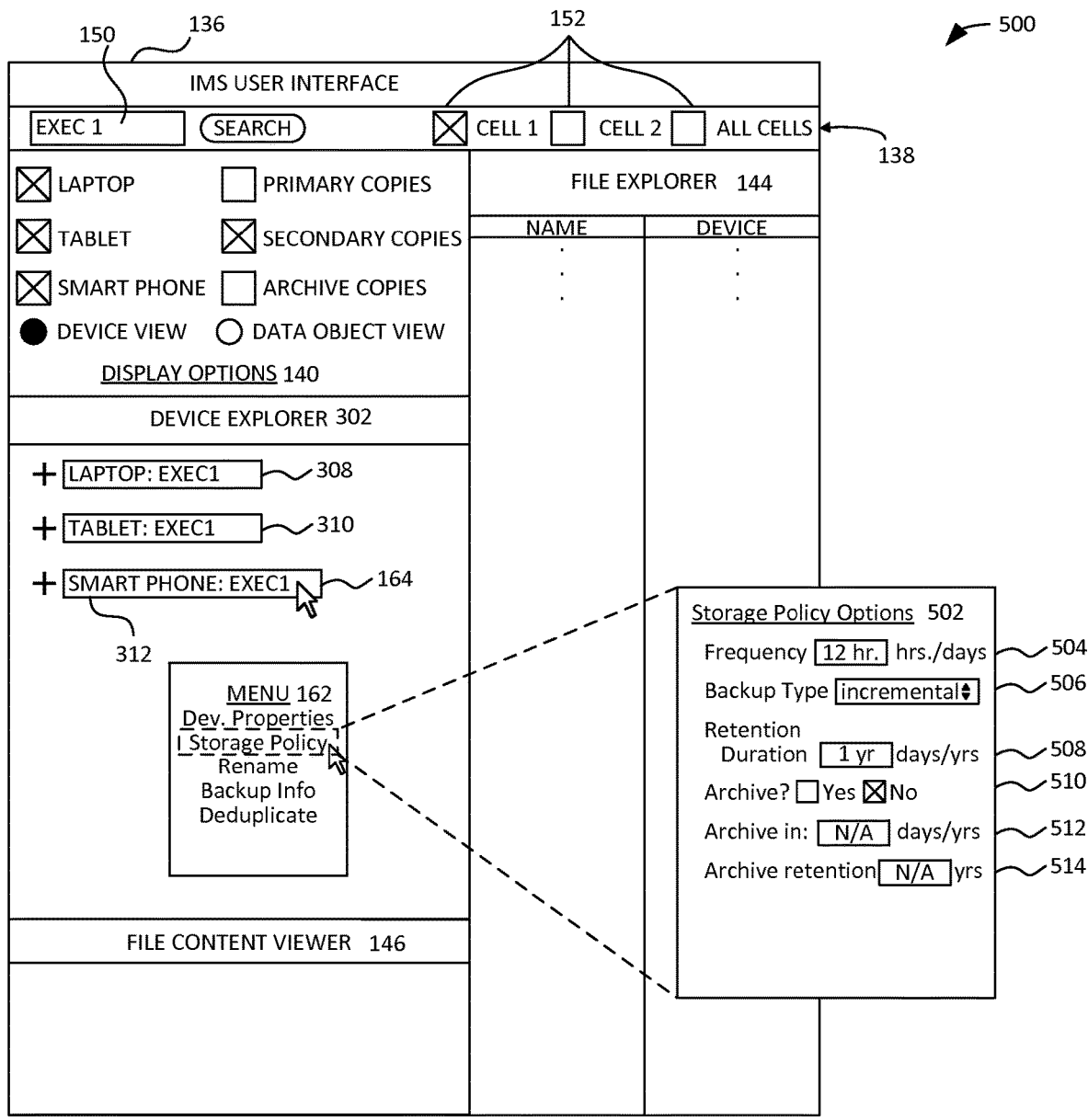
FIG. 5 is a detailed view illustrating an example of an instance of an information management system user interface for adjusting an information management policy of data objects.

FIG. 5 illustrates an instance 500 of the IMS user interface 136, showing information management features extendable to a user through the IMS user interface 136, in accordance with an implementation of the disclosure. The instance 500 of the IMS user interface 136 shows a storage policy menu 502 that is provided to a user to enable the user to specify or to adjust data storage and/or data retention policies for devices associated with a particular user. According to an embodiment, the storage policy menu 502 can be selected or initiated from the menu 162. The storage policy menu 502 may include various storage policy configurations/options, such as a frequency of backups 504, a backup type selection 506, selection for retention duration of backup copies 508, an archive option 510, an archive threshold option 512, and an archive retention setting 514. The options in the storage policy menu 502 provide similar benefits to the user as the deduplication menu 304 and the deduplication menu 306. That is, the storage policy menu 502 empowers a user to have more granular control over specific devices that are typically within the user's stewardship.

The frequency of backups option 504 allows a user to select how frequently secondary copies are made for data objects of a particular device or for subfolders of a particular device. The frequency can be specified in terms of hours, days, months, and/or years. With greater frequency of backup, the user receives a more granular ability to restore his/her device to a previous condition, in the event of the device failure. The price for this granularity is, however, paid in terms of data storage usage and network bandwidth consumption while transferring information from primary storage devices to secondary storage devices.

The backup type selection 506 allows the user to select between one of a number of types of backup operations to be performed at the specified frequency. Some backup operation types include full backup, hybrid backup, hierarchical storage management ("HSM") copy, incremental backup, and the like. The type of backup operation selected by the user will have various trade-offs associated with speed, network consumption, and secondary storage device consumption. Further information about the listed types of back up operations and further example embodiments of backup operation types that can be selected in the IMS user interface 136 are described below in the discussion associated with FIGS. 8A-8H.

The retention duration of backup copies 508 enables the user to determine how long to retain backup copies. In one embodiment, the user can also choose to overwrite previous backup copies with a current backup copy to reduce the amount of secondary storage resources consumed by the user.

The archive option 510 allows a user to choose whether or not the user would like secondary copies archived. An archive copy can be different from other backup operation types in that archive copies may have a format that is different than the primary data, and an archive operation typically deletes the file being archived. Archive copies are typically made or stored on slower and less costly storage media, to reduce the financial impact of storing less-used data for extended periods of time.

The archive threshold option 512 enables the user to determine when secondary copies are transitioned to archive copies. A user may want to configure the storage manager 106 to archive a secondary copy in days, months, or years after the creation of secondary copy. In some embodiments, the archive threshold 512 is set to be the same as the retention duration 508 so that upon expiration of the retention duration 508, or just prior to, the storage manager 106 archives the secondary copies of the data object(s).

The archive retention setting 514 enables a user to determine how long an archive copy will be retained. For some types of data, such as financial data, the archive retention option 514 may be set to coincide with legal compliance record requirements established by one or more government entities, e.g., the Internal Revenue Service or the Securities Exchange Commission.

The instance 500 of the IMS user interface 136 shows embodiments of how the storage manager 106 can extend data storage and data retention policy control to a user of one or more consumer electronic devices or other computing devices. Although this storage policy menu 502 is illustrated as being applied in a device view of the IMS user interface 136, the storage policy menu 502 can also be applied to a data object view of the IMS user interface 136. In other words, if the "data object view" radio button is selected in the display options 140, the device explorer 302 will be replaced by the folder explorer 142 (shown in FIG. 1). As discussed in connection with FIG. 1, the data object view may be used to provide a device-agnostic and user-centric view of all of a user's data. However, as illustrated in the instance 500, a user may also choose to manage his/her data by selecting the "device view" radio button from the display options 140 to apply data management policies to specific ones of a user's devices. Further examples of embodiments of data storage and data retention policy options, implementations, and adjustments that may be available to the user through the IMS user interface 136 are described below in the discussion associated with FIG. 8A-8H.

Figure 6:
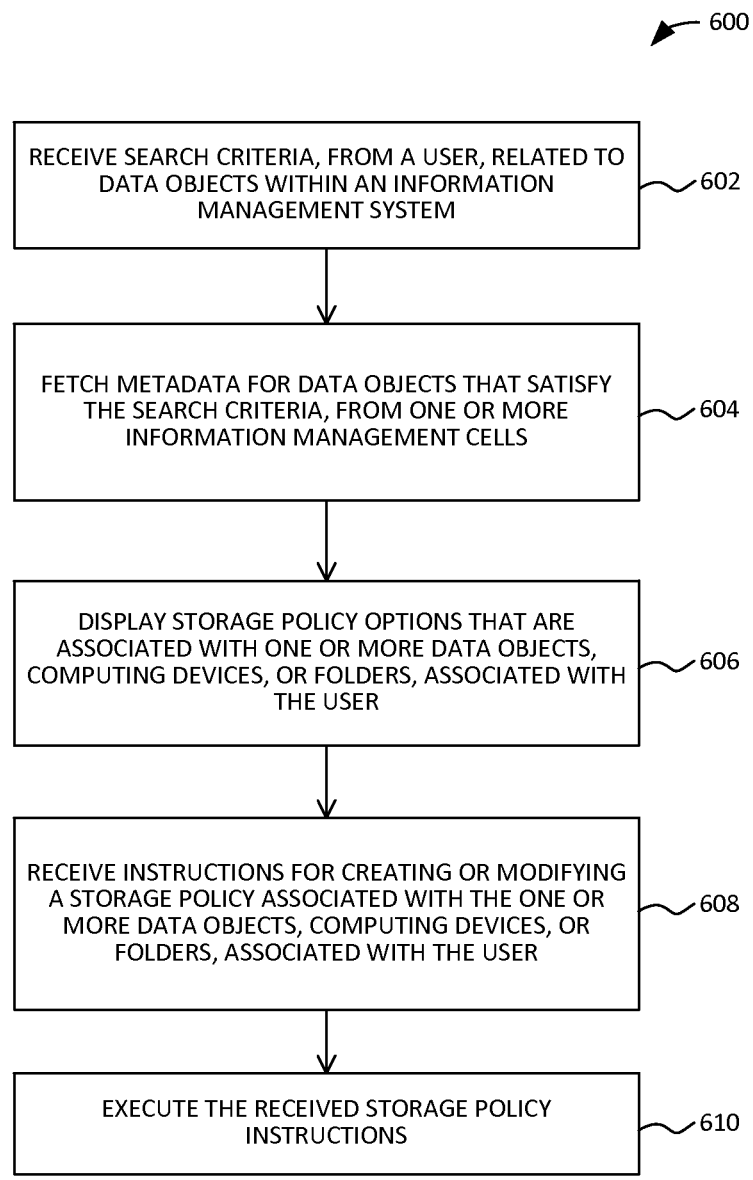
FIG. 6 is a flow diagram illustrating a method of providing information management policy features in an information management system user interface.

FIG. 6 illustrates a method 600 for providing storage policy options to a user for devices associated with that user. As discussed above, advantages of controlling storage policy include the ability to manage the amount of bandwidth and secondary storage resources consumed by a particular user.

At block 602, a computing device receives search criteria from a user. The search criteria can include username, information management system cell selection, particular devices, types of data objects, locations of data objects, and the like.

At block 604, the computing device fetches metadata for data objects that satisfy the received search criteria. The computing device may not have to fetch the actual data objects to apply or to update storage policy configurations stored within the information management system 100.

At block 606, the computing device can provide the user with various storage policy options for the one or more computing devices associated with the user. The computing device may provide these options to the user via a series of menus that the user may select from via the user interface.

At block 608, the computing device may receive instructions for creating or adjusting a storage policy of one or more computing devices. These instructions can include, e.g., a type of backup operation, a frequency for executing the policy, and devices that are applicable to the storage policy.

At block 610, the computing device can execute the requested storage policy operations in one or more information management system cells. The computing device can perform these storage policy operations by updating one or more databases within the information management system 100 and/or by initiating communications with one or more of the data agents 112 and media agents 122, in accordance with an embodiment. More details on exemplary embodiments of storage policies and the execution of storage policies are provided below in the description associated with FIGS. 8A-8H.

Figure 7:
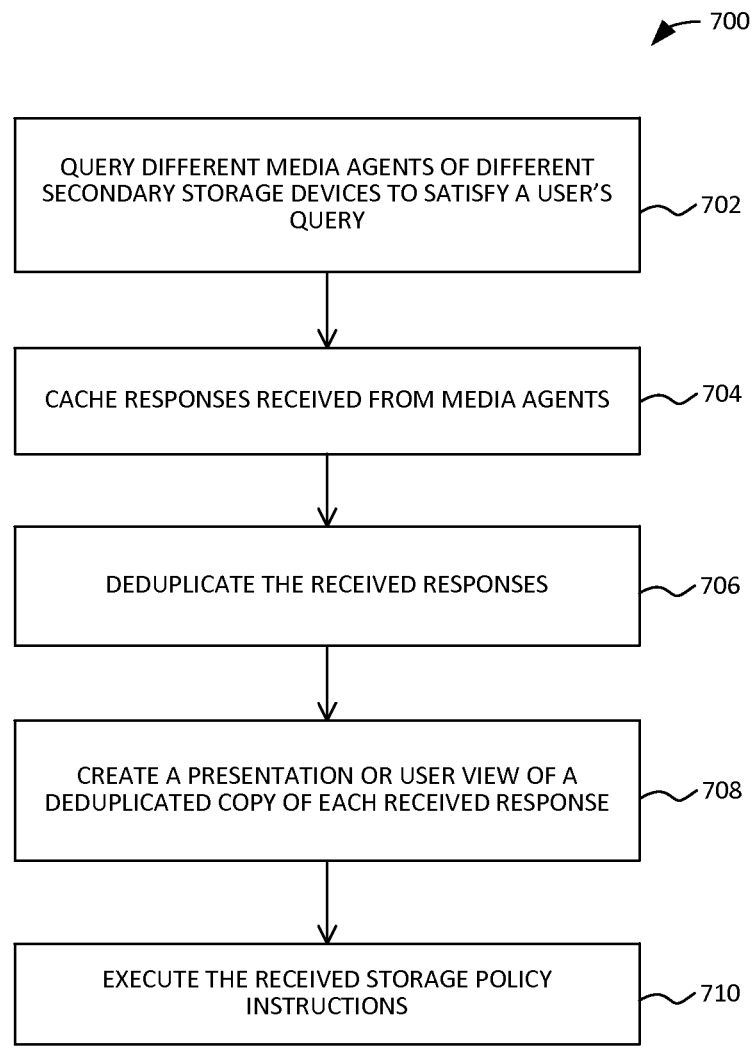
FIG. 7 is a flow diagram illustrating a method of providing a deduplicated view of data objects in an information management system.

FIG. 7 illustrates a method 700 for presenting a simplified view of data objects to a user. The simplified view allows a user to navigate his/her data objects without the hassle or confusion of managing duplicates of data objects having the same content.

At block 702, an information management system queries different media agents of different secondary storage devices to satisfy a user's query. The queried media agents search the contents of the secondary storage devices associated with the media agents by, for example, searching media agent indices that store metadata and/or keywords associated with content of data objects stored in the secondary storage devices.

At block 704, the information management system caches all responses received from the media agents. The media agent responses include metadata about data objects that satisfy the query criteria. In some implementations, the metadata includes hashes or cryptographically unique identifiers of the content of the data objects that satisfy the query criteria. In other implementations, the media agent responses include copies of the data objects, including data object content.

At block 706, the information management system deduplicates the received responses. The information management system may deduplicate the responses by comparing filenames, and selecting only one file where multiple files having the same name are identified (such as the file having the most recent modified or stored date obtained from its associated metadata). Alternatively or additionally, the system may perform de-duplication by comparing metadata, e.g., the hashes or cryptographically unique identifiers of content, of the data objects. If certain metadata of the data objects is the same, the information management system determines that the data objects are duplicates of each other. The information management system may then remove duplicate objects from the cached responses so that single copy of data object or data object metadata is cached for each data object. Further, the system may provide for a method of adjusting the granularity of similarity, such that files having 95% or greater similarity are considered to be the same file, and that only one file is selected (again, e.g., defaulting to the file with the most recent date).

At block 708, the information management system creates a presentation or user view of a single copy of each response after deduplication. The user view of the single copy may include a name of the data object, a location of the data object within the information management system, a source device for the data object, and/or other identifying information of the data object that is based on metadata for the data object.

At block 710, the information management system provides the deduplicated user view to the user via a user interface. The user interface can be displayed on a client computing device or any network-enabled computing device. The user interface may be hosted by a computing device within the information management system, such as a storage manager, but may also be downloadable to one or more mobile devices, such as a smart phone.

Described herein are methods and systems for providing user-centric access to data objects stored within an information management system. By changing the emphasis from device-centric to user-centric (device-agnostic), the user is able to explore and manage data objects based on the relationship of the data objects to the user. The systems and methods described above also provide the user with functions, such as deduplication and management of data storage policies, that have historically been reserved to system administrators. However, by allowing a user to manage data object deduplication and storage policies for data objects associated with the user or the user's computing devices, the user can more efficiently and effectively manage the user's bandwidth consumption and memory consumption. Thus, some of the previously disclosed embodiments enable a user to better make cost conscious decisions about what, when, and how to backup and retain data objects in an information management system.

Hereafter, various example systems are illustrated and described to provide further examples of embodiments into which the systems and methods of FIGS. 1-7 may be implemented and integrated. Additionally, systems illustrated in FIGS. 8A-8H, and the related discussion, further expound on additional features of each of the components introduced in information management system 100 and in user interface instances 300 and 500. Taken together with the disclosure of FIGS. 1-6, the systems of FIGS. 8A-8H describe additional embodiments of implementation details.

Information Management System Overview

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 8A:
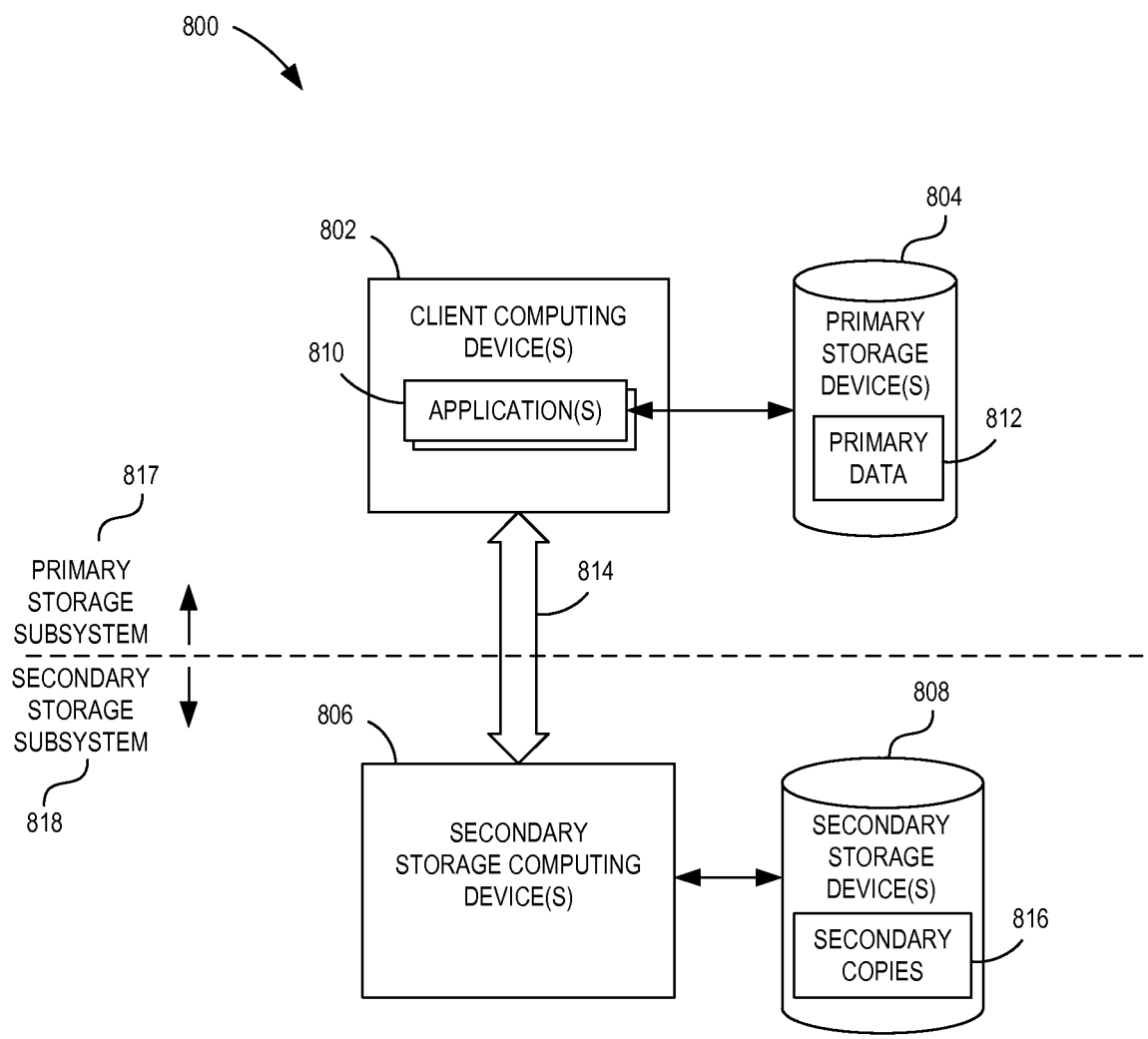
FIG. 8A is a block diagram illustrating an exemplary information management system.

Certain embodiments described herein provide systems and methods capable of addressing these and other shortcomings of prior approaches by implementing unified, orga- nization-wide information management. FIG. 8A shows one such information management system 800, which generally includes combinations of hardware and software configured to protect and to manage data and metadata generated and used by the various computing devices in the information management system 800.

The organization which employs the information management system 800 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 7,035,880, entitled "Modular Backup and Retrieval System Used in Conjunction With a Storage Area Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,246,207, entitled "System and Method for Dynamically Performing Storage Operations in a Computer Network";
- U.S. Pat. No. 7,747,579, entitled "Metabase for Facilitating Data Classification";
- U.S. Pat. No. 8,229,954, entitled "Managing Copies of Data";
- U.S. Pat. No. 7,617,262, entitled "System and Methods for Monitoring Application Data in a Data Replication System";
- U.S. Pat. No. 7,529,782, entitled "System and Methods for Performing a Snapshot and for Restoring Data";
- U.S. Pat. No. 8,230,195, entitled "System And Method For Performing Auxiliary Storage Operations";
- U.S. Pat. No. 7,315,923, entitled "System And Method For Combining Data Streams In Pipelined Storage Operations In A Storage Network";
- U.S. Pat. No. 8,364,652, entitled "Content-Aligned, Block-Based Deduplication";
- U.S. Pat. Pub. No. 2006/0224846, entitled "System and Method to Support Single Instance Storage Operations";
- U.S. Pat. No. 8,578,120, entitled "Block-Level Single Instancing";
- U.S. Pat. Pub. No. 2009/0319534, entitled "Application-Aware and Remote Single Instance Data Management";
- U.S. Pat. Pub. No. 2012/0150826, entitled "Distributed Deduplicated Storage System";
- U.S. Pat. Pub. No. 2012/0150818, entitled "Client-Side Repository in a Networked Deduplicated Storage System";
- U.S. Pat. No. 8,170,995, entitled "Method and System for Offline Indexing of Content and Classifying Stored Data";

U.S. Pat. No. 7,107,298, entitled "System And Method For Archiving Objects In An Information Store";

U.S. Pat. No. 8,230,195, entitled "System And Method For Performing Auxiliary Storage Operations";

U.S. Pat. No. 8,229,954, entitled "Managing Copies Of Data"; and

U.S. Pat. No. 8,156,086, entitled "Systems And Methods For Stored Data Verification".

The information management system 800 can include a variety of different computing devices. For instance, as will be described in greater detail herein, the information management system 800 can include one or more client computing devices 802 and secondary storage computing devices 806.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host computer. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 800 can also include a variety of storage devices, including primary storage devices 804 and secondary storage devices 808, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 800 includes one or more client computing device 802 having at least one application 810 executing thereon, and one or more primary storage devices 804 storing primary data 812. The client computing device(s) 802 and the primary storage devices 804 may generally be referred to in some cases as a primary storage subsystem 817. A computing device in an information management system 800 that has a data agent 842 installed on it is generally referred to as a client computing device 802 (or, in the context of a component of the information management system 800 simply as a "client").

Depending on the context, the term "information management system" can refer to generally all of the illustrated hardware and software components. Or, in other instances, the term may refer to only a subset of the illustrated components.

For instance, in some cases, the information management system 800 generally refers to a combination of specialized components used to protect, move, manage, manipulate, analyze, and/or process data and metadata generated by the client computing devices 802. However, the information management system 800 in some cases does not include the underlying components that generate and/or store the primary data 812, such as the client computing devices 802 themselves, the applications 810 and operating system residing on the client computing devices 802, and the primary storage devices 804. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 800, the data generation sources include the one or more client computing devices 802.

The client computing devices 802 may include any of the types of computing devices described above, without limitation, and in some cases the client computing devices 802 are associated with one or more users and/or corresponding user accounts, of employees or other individuals.

The information management system 800 generally addresses and handles the data management and protection needs for the data generated by the client computing devices 802. However, the use of this term does not imply that the client computing devices 802 cannot be "servers" in other respects. For instance, a particular client computing device 802 may act as a server with respect to other devices, such as other client computing devices 802. As just a few examples, the client computing devices 802 can include mail servers, file servers, database servers, and web servers.

Each client computing device 802 may have one or more applications 810 (e.g., software applications) executing thereon which generate and manipulate the data that is to be protected from loss and managed.

The applications 810 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 802 can have at least one operating system (e.g., Microsoft Windows, Mac OS X, iOS, IBM z/OS, Linux, other Unix-based operating systems, etc.) installed thereon, which may support or host one or more file systems and other applications 810.

As shown, the client computing devices 802 and other components in the information management system 800 can be connected to one another via one or more communication pathways 814. The communication pathways 814 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 814 in some cases may also include application programming interfaces (APIs) including, e.g., cloud service provider APIs, virtual machine management APIs, and hosted service provider APIs.

Primary Data and Exemplary Primary Storage Devices

Primary data 812 according to some embodiments is production data or other "live" data generated by the operating system and other applications 810 residing on a client computing device 802. The primary data 812 is generally stored on the primary storage device(s) 804 and is organized via a file system supported by the client computing device 802. For instance, the client computing device(s) 802 and corresponding applications 810 may create, access, modify, write, delete, and otherwise use primary data 812. In some cases, some or all of the primary data 812 can be stored in cloud storage resources.

Primary data 812 is generally in the native format of the source application 810. According to certain aspects, primary data 812 is an initial or first (e.g., created before any other copies or before at least one other copy) stored copy of data generated by the source application 810. Primary data 812 in some cases is created substantially directly from data generated by the corresponding source applications 810.

The primary data 812 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 804 storing the primary data 812 may be relatively fast and/or expensive (e.g., a disk drive, a hard-disk array, solid state memory, etc.). In addition, primary data 812 may be intended for relatively short term retention (e.g., several hours, days, or weeks).

According to some embodiments, the client computing device 802 can access primary data 812 from the primary storage device 804 by making conventional file system calls via the operating system. Primary data 812 representing files may include structured data (e.g., database files), unstructured data (e.g., documents), and/or semi-structured data. Some specific examples are described below with respect to FIG. 8B.

It can be useful in performing certain tasks to organize the primary data 812 into units of different granularities. In general, primary data 812 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 800 to access and modify metadata within the primary data 812. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 810 and/or other components of the information management system 800 maintain indices of metadata for data objects, e.g., metadata associated with individual email messages. Thus, each data object may be associated with corresponding metadata. The use of metadata to perform classification and other functions is described in greater detail below.

Each of the client computing devices 802 are generally associated with and/or in communication with one or more of the primary storage devices 804 storing corresponding primary data 812. A client computing device 802 may be considered to be "associated with" or "in communication with" a primary storage device 804 if it is capable of one or more of: routing and/or storing data to the particular primary storage device 804, coordinating the routing and/or storing of data to the particular primary storage device 804, retrieving data from the particular primary storage device 804, coordinating the retrieval of data from the particular primary storage device 804, and modifying and/or deleting data retrieved from the particular primary storage device 804.

The primary storage devices 804 can include any of the different types of storage devices described above, or some other kind of suitable storage device. The primary storage devices 804 may have relatively fast I/O times and/or are relatively expensive in comparison to the secondary storage devices 808. For example, the information management system 800 may generally regularly access data and metadata stored on primary storage devices 804, whereas data and metadata stored on the secondary storage devices 808 is accessed relatively less frequently.

In some cases, each primary storage device 804 is dedicated to an associated client computing device 802. For instance, a primary storage device 804 in one embodiment is a local disk drive of a corresponding client computing device 802. In other cases, one or more primary storage devices 804 can be shared by multiple client computing devices 802, e.g., via a network such as in a cloud storage implementation. As one example, a primary storage device 804 can be a disk array shared by a group of client computing devices 802, such as one of the following types of disk arrays: EMC Clariion, EMC Symmetrix, EMC Celerra, Dell EqualLogic, IBM XIV, NetApp FAS, HP EVA, and HP 3PAR.

The information management system 800 may also include hosted services (not shown), which may be hosted in some cases by an entity other than the organization that employs the other components of the information management system 800. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 800, e.g., as primary data 812. In some cases, the hosted services may be accessed using one of the applications 810. As an example, a hosted mail service may be accessed via browser running on a client computing device 802. The hosted services may be implemented in a variety of computing environments. In some cases, they are implemented in an environment having a similar arrangement to the information management system 800, where various physical and logical components are distributed over a network.

Secondary Copies and Exemplary Secondary Storage Devices

The primary data 812 stored on the primary storage devices 804 may be compromised in some cases, such as when an employee deliberately or accidentally deletes or overwrites primary data 812 during their normal course of work. Or the primary storage devices 804 can be damaged or otherwise corrupted.

For recovery and/or regulatory compliance purposes, it is therefore useful to generate copies of the primary data 812. Accordingly, the information management system 800 includes one or more secondary storage computing devices 806 and one or more secondary storage devices 808 configured to create and store one or more secondary copies 816 of the primary data 812 and associated metadata. The secondary storage computing devices 806 and the secondary storage devices 808 may sometimes be referred to as a secondary storage subsystem 818.

Creation of secondary copies 816 can help in search and analysis efforts and meet other information management goals, such as: restoring data and/or metadata if an original version (e.g., of primary data 812) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 802 access or receive primary data 812 and communicate the data, e.g., over the communication pathways 814, for storage in the secondary storage device(s) 808.

A secondary copy 816 can comprise a separate stored copy of application data that is derived from one or more earlier-created, stored copies (e.g., derived from primary data 812 or another secondary copy 816). Secondary copies 816 can include point-in-time data, and may be intended for relatively long-term retention (e.g., weeks, months or years), before some or all of the data is moved to other storage or is discarded.

In some cases, a secondary copy 816 is a copy of application data created and stored subsequent to at least one other stored instance (e.g., subsequent to corresponding primary data 812 or to another secondary copy 816), in a different storage device than at least one previous stored copy, and/or remotely from at least one previous stored copy. In some other cases, secondary copies can be stored in the same storage device as primary data 812 and/or other previously stored copies. For example, in one embodiment a disk array capable of performing hardware snapshots stores primary data 812 and creates and stores hardware snapshots of the primary data 812 as secondary copies 816. Secondary copies 816 may be stored in relatively slow and/or low cost storage (e.g., magnetic tape). A secondary copy 816 may be stored in a backup or archive format, or in some other format different than the native source application format or other primary data format.

In some cases, secondary copies 816 are indexed so users can browse and restore at another point in time. After creation of a secondary copy 816 representative of certain primary data 812, a pointer or other location indicia (e.g., a stub) may be placed in primary data 812, or be otherwise associated with primary data 812 to indicate the current location on the secondary storage device(s) 808.

Since an instance of a data object or metadata in primary data 812 may change over time as it is modified by an application 810 (or hosted service or the operating system), the information management system 800 may create and manage multiple secondary copies 816 of a particular data object or metadata, each representing the state of the data object in primary data 812 at a particular point in time. Moreover, since an instance of a data object in primary data 812 may eventually be deleted from the primary storage device 804 and the file system, the information management system 800 may continue to manage point-in-time representations of that data object, even though the instance in primary data 812 no longer exists.

For virtualized computing devices the operating system and other applications 810 of the client computing device(s) 802 may execute within or under the management of virtualization software (e.g., a VMM), and the primary storage device(s) 804 may comprise a virtual disk created on a physical storage device. The information management system 800 may create secondary copies 816 of the files or other data objects in a virtual disk file and/or secondary copies 816 of the entire virtual disk file itself (e.g., of an entire .vmdk file).

Secondary copies 816 may be distinguished from corresponding primary data 812 in a variety of ways, some of which will now be described. First, as discussed, secondary copies 816 can be stored in a different format (e.g., backup, archive, or other non-native format) than primary data 812. For this or other reasons, secondary copies 816 may not be directly useable by the applications 810 of the client computing device 802, e.g., via standard system calls or otherwise without modification, processing, or other intervention by the information management system 800.

Secondary copies 816 are also in some embodiments stored on a secondary storage device 808 that is inaccessible to the applications 810 running on the client computing devices 802 (and/or hosted services). Some secondary copies 816 may be "offline copies," in that they are not readily available (e.g., not mounted to tape or disk). Offline copies can include copies of data that the information management system 800 can access without human intervention (e.g., tapes within an automated tape library, but not yet mounted in a drive), and copies that the information management system 800 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 802 continually generating large volumes of primary data 812 to be protected. Also, there can be significant overhead involved in the creation of secondary copies 816. Moreover, secondary storage devices 808 may be special purpose components, and interacting with them can require specialized intelligence.

In some cases, the client computing devices 802 interact directly with the secondary storage device 808 to create the secondary copies 816. However, in view of the factors described above, this approach can negatively impact the ability of the client computing devices 802 to serve the applications 810 and produce primary data 812. Further, the client computing devices 802 may not be optimized for interaction with the secondary storage devices 808.

Thus, in some embodiments, the information management system 800 includes one or more software and/or hardware components which generally act as intermediaries between the client computing devices 802 and the secondary storage devices 808. In addition to off-loading certain responsibilities from the client computing devices 802, these intermediate components can provide other benefits. For instance, as discussed further below with respect to FIG. 8D, distributing some of the work involved in creating secondary copies 816 can enhance scalability.

The intermediate components can include one or more secondary storage computing devices 806 as shown in FIG. 8A and/or one or more media agents, which can be software modules residing on corresponding secondary storage computing devices 806 (or other appropriate devices). Media agents are discussed below (e.g., with respect to FIGS. 8C-8E).

The secondary storage computing device(s) 806 can comprise any of the computing devices described above, without limitation. In some cases, the secondary storage computing device(s) 806 include specialized hardware and/or software componentry for interacting with the secondary storage devices 808.

To create a secondary copy 816 involving the copying of data from the primary storage subsystem 817 to the secondary storage subsystem 818, the client computing device 802 in some embodiments communicates the primary data 812 to be copied (or a processed version thereof) to the designated secondary storage computing device 806, via the communication pathway 814. The secondary storage computing device 806 in turn conveys the received data (or a processed version thereof) to the secondary storage device 808. In some such configurations, the communication pathway 814 between the client computing device 802 and the secondary storage computing device 806 comprises a portion of a LAN, WAN or SAN. In other cases, at least some client computing devices 802 communicate directly with the secondary storage devices 808 (e.g., via Fibre Channel or SCSI connections). In some other cases, one or more secondary copies 816 are created from existing secondary copies, such as in the case of an auxiliary copy operation, described in greater detail below.

Exemplary Primary Data and an Exemplary Secondary Copy

Figure 8B:
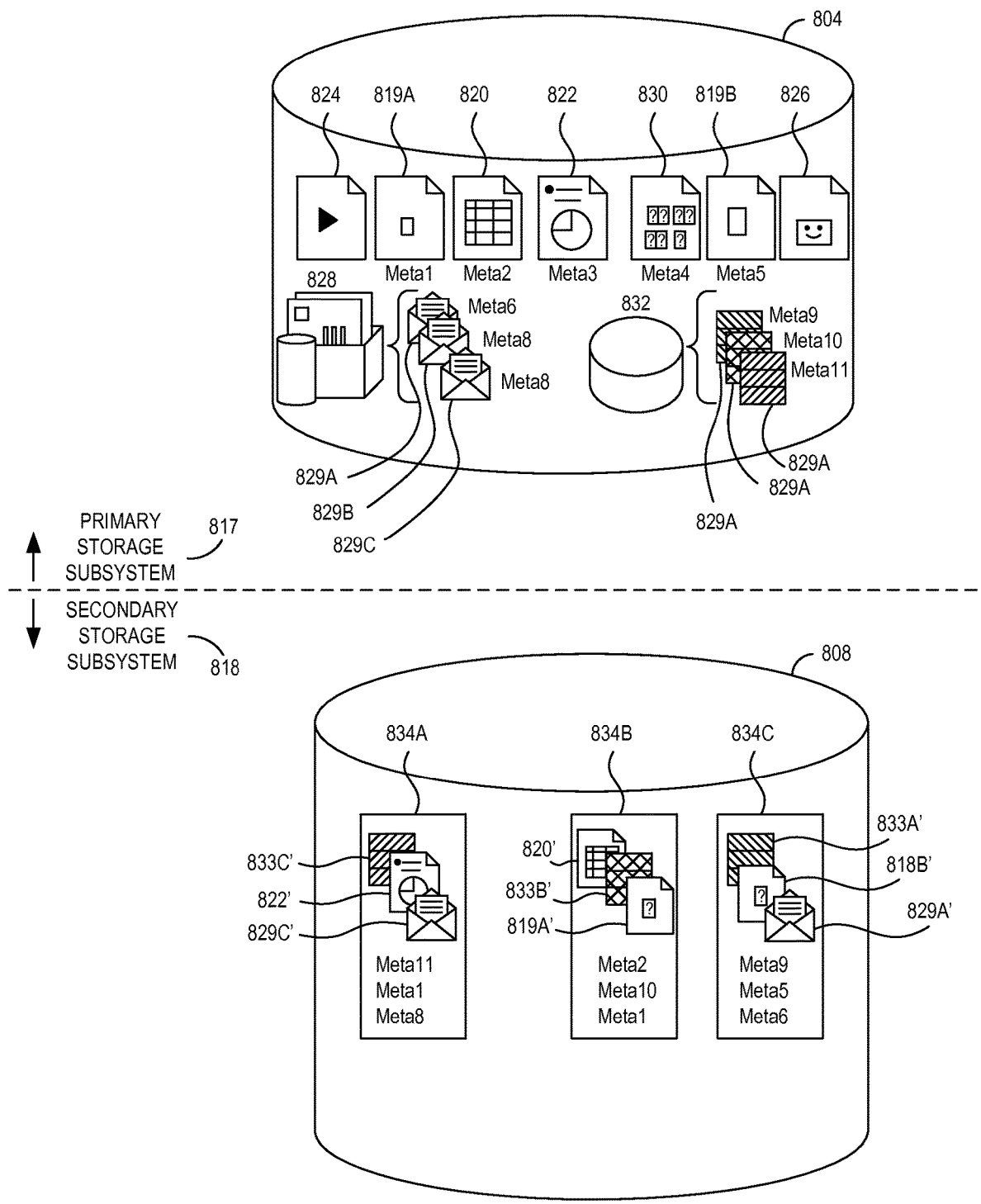
FIG. 8B is a detailed view illustrating a primary storage device, a secondary storage device, and some examples of primary data and secondary copy data.

FIG. 8B is a detailed view showing some specific examples of primary data stored on the primary storage device(s) 804 and secondary copy data stored on the secondary storage device(s) 808, with other components in the system removed for the purposes of illustration. Stored on the primary storage device(s) 804 are primary data objects including word processing documents 819A-B, spreadsheets 820, presentation documents 822, video files 824, image files 826, email mailboxes 828 (and corresponding email messages 829A-C), html/xml or other types of markup language files 830, databases 832 and corresponding tables or other data structures 833A-833C).

Some or all primary data objects are associated with corresponding metadata (e.g., "Meta1-11"), which may include file system metadata and/or application specific metadata. Stored on the secondary storage device(s) 808 are secondary copy data objects 834A-C which may include copies of or otherwise represent corresponding primary data objects and metadata.

As shown, the secondary copy data objects 834A-C can individually represent more than one primary data object. For example, secondary copy data object 834A represents three separate primary data objects 833C, 822 and 829C (represented as 833C', 822' and 829C', respectively, and accompanied by the corresponding metadata Meta11, Meta3, and Meta8, respectively). Moreover, as indicated by the prime mark ('), a secondary copy object may store a representation of a primary data object or metadata differently than the original format, e.g., in a compressed, encrypted, deduplicated, or other modified format. Likewise, secondary data object 834B represents primary data objects 820, 833B, and 819A as 820', 833B', and 819A', respectively and accompanied by corresponding metadata Meta2, Meta10, and Meta1, respectively. Also, secondary data object 834C represents primary data objects 833A, 819B, and 829A as 833A', 819B', and 829A', respectively, accompanied by corresponding metadata Meta9, Meta5, and Meta6, respectively.

Exemplary Information Management System Architecture

The information management system 800 can incorporate a variety of different hardware and software components, which can in turn be organized with respect to one another in many different configurations, depending on the embodiment. There are critical design choices involved in specifying the functional responsibilities of the components and the role of each component in the information management system 800. For instance, as will be discussed, such design choices can impact performance as well as the adaptability of the information management system 800 to data growth or other changing circumstances.

Figure 8C:
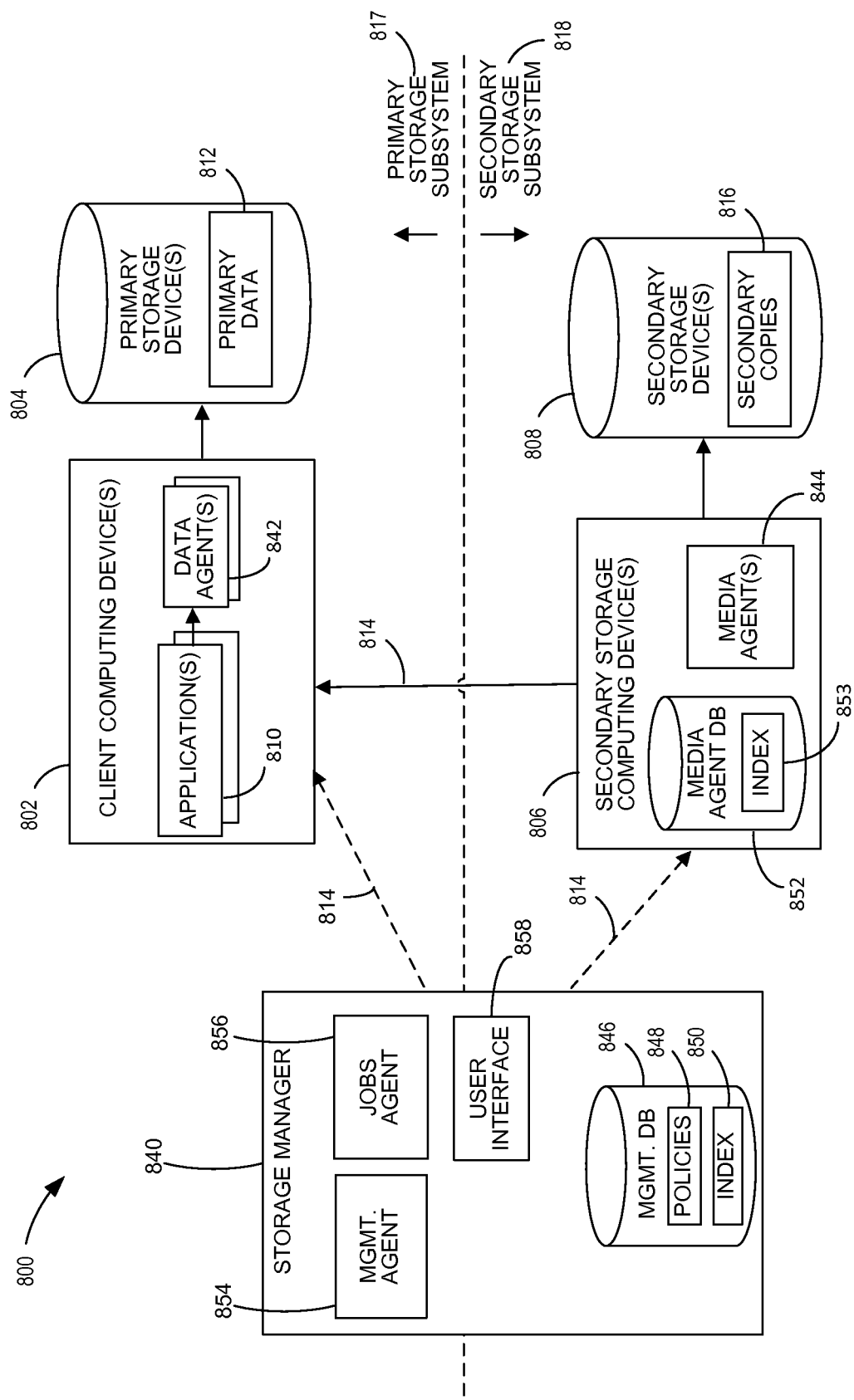
FIG. 8C is a block diagram illustrating an exemplary information management system including a storage manager, one or more data agents, and one or more media agents.

FIG. 8C shows an information management system 800 designed according to these considerations and which includes: storage manager 840, a centralized storage and/or information manager that is configured to perform certain control functions, one or more data agents 842 executing on the client computing device(s) 802 configured to process primary data 812, and one or more media agents 844 executing on the one or more secondary storage computing devices 806 for performing tasks involving the secondary storage devices 808. While distributing functionality amongst multiple computing devices can have certain advantages, in other contexts it can be beneficial to consolidate functionality on the same computing device. As such, in various other embodiments, one or more of the components shown in FIG. 8C as being implemented on separate computing devices are implemented on the same computing device. In one configuration, a storage manager 840, one or more data agents 842, and one or more media agents 844 are all implemented on the same computing device. In another embodiment, one or more data agents 842 and one or more media agents 844 are implemented on the same computing device, while the storage manager 840 is implemented on a separate computing device.

Storage Manager

As noted, the number of components in the information management system 800 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 800, or at least a significant portion of that responsibility, is allocated to the storage manager 840.

By distributing control functionality in this manner, the storage manager 840 can be adapted independently according to changing circumstances. Moreover, a computing device for hosting the storage manager 840 can be selected to best suit the functions of the storage manager 840. These and other advantages are described in further detail below with respect to FIG. 8D.

The storage manager 840 may be a software module or other application. In some embodiments, storage manager 840 is a computing device comprising circuitry for executing computer instructions and performs the functions described herein. The storage manager generally initiates, performs, coordinates and/or controls storage and other information management operations performed by the information management system 800, e.g., to protect and control the primary data 812 and secondary copies 816 of data and metadata.

As shown by the dashed arrowed lines 814, the storage manager 840 may communicate with and/or control some or all elements of the information management system 800, such as the data agents 842 and media agents 844. Thus, in certain embodiments, control information originates from the storage manager 840, whereas payload data and payload metadata is generally communicated between the data agents 842 and the media agents 844 (or otherwise between the client computing device(s) 802 and the secondary storage computing device(s) 806), e.g., at the direction of the storage manager 840. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 808 in a secondary copy operation. Payload metadata can include any of the types of metadata described herein, and may be written to a storage device along with the payload content data (e.g., in the form of a header).

In other embodiments, some information management operations are controlled by other components in the information management system 800 (e.g., the media agent(s) 844 or data agent(s) 842), instead of or in combination with the storage manager 840.

According to certain embodiments, the storage manager 840 provides one or more of the following functions:

initiating execution of secondary copy operations;

managing secondary storage devices 808 and inventory/capacity of the same;

reporting, searching, and/or classification of data in the information management system 800;

allocating secondary storage devices 808 for secondary storage operations;

monitoring completion of and providing status reporting related to secondary storage operations;

tracking age information relating to secondary copies 816, secondary storage devices 808, and comparing the age information against retention guidelines;

tracking movement of data within the information management system 800;

tracking logical associations between components in the information management system 800;

protecting metadata associated with the information management system 800; and implementing operations management functionality.

The storage manager 840 may maintain a database 846 (or "storage manager database 846" or "management database 846") of management-related data and information management policies 848. The database 846 may include a management index 850 (or "index 850") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 840 may use the index 850 to track logical associations between media agents 844 and secondary storage devices 808 and/or movement of data from primary storage devices 804 to secondary storage devices 808. For instance, the index 850 may store data associating a client computing device 802 with a particular media agent 844 and/or secondary storage device 808, as specified in an information management policy 848 (e.g., a storage policy, which is defined in more detail below).

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 800 may utilize information management policies 848 for specifying and executing information management operations (e.g., on an automated basis). Generally, an information management policy 848 can include a data structure or other information source that specifies a set of parameters (e.g., criteria and rules) associated with storage or other information management operations.

The storage manager database 846 may maintain the information management policies 848 and associated data, although the information management policies 848 can be stored in any appropriate location. For instance, an information management policy 848 such as a storage policy may be stored as metadata in a media agent database 852 or in a secondary storage device 808 (e.g., as an archive copy) for use in restore operations or other information management operations, depending on the embodiment. Information management policies 848 are described further below.

According to certain embodiments, the storage manager database 846 comprises a relational database (e.g., an SQL database) for tracking metadata, such as metadata associated with secondary copy operations (e.g., what client computing devices 802 and corresponding data were protected). This and other metadata may additionally be stored in other locations, such as at the secondary storage computing devices 806 or on the secondary storage devices 808, allowing data recovery without the use of the storage manager 840.

As shown, the storage manager 840 may include a jobs agent 856, a user interface 858, and a management agent 854, all of which may be implemented as interconnected software modules or application programs.

The jobs agent 856 in some embodiments initiates, controls, and/or monitors the status of some or all storage or other information management operations previously performed, currently being performed, or scheduled to be performed by the information management system 800. For instance, the jobs agent 856 may access information management policies 848 to determine when and how to initiate and control secondary copy and other information management operations, as will be discussed further.

The user interface 858 may include information processing and display software, such as a graphical user interface ("GUI"), an application program interface ("API"), or other interactive interface(s) through which users and system processes can retrieve information about the status of information management operations (e.g., storage operations) or issue instructions to the information management system 800 and its constituent components.

Via the user interface 858, users may optionally issue instructions to the components in the information management system 800 regarding performance of storage and recovery operations. For example, a user may modify a schedule concerning the number of pending secondary copy operations. As another example, a user may employ the GUI to view the status of pending storage operations or to monitor the status of certain components in the information management system 800 (e.g., the amount of capacity left in a storage device).

An information management "cell" may generally include a logical and/or physical grouping of a combination of hardware and software components associated with performing information management operations on electronic data, typically one storage manager 840 and at least one client computing device 802 (comprising data agent(s) 842) and at least one media agent 844. For instance, the components shown in FIG. 8C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 840 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 858. In general, the management agent 854 allows multiple information management cells to communicate with one another. For example, the information management system 800 in some cases may be one information management cell of a network of multiple cells adjacent to one another or otherwise logically related in a WAN or LAN. With this arrangement, the cells may be connected to one another through respective management agents 854.

For instance, the management agent 854 can provide the storage manager 840 with the ability to communicate with other components within the information management system 800 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 810 can reside on a given client computing device 802, including operating systems, database applications, e-mail applications, and virtual machines, just to name a few. And, as part of the process of creating and restoring secondary copies 816, the client computing devices 802 may be tasked with processing and preparing the primary data 812 from these various different applications 810. Moreover, the nature of the processing/preparation can differ across clients and application types, e.g., due to inherent structural and formatting differences between applications 810.

The one or more data agent(s) 842 are therefore advantageously configured in some embodiments to assist in the performance of information management operations based on the type of data that is being protected, at a client-specific and/or application-specific level.

The data agent 842 may be a software module or component that is generally responsible for managing, initiating, or otherwise assisting in the performance of information management operations. For instance, the data agent 842 may take part in performing data storage operations such as the copying, archiving, migrating, replicating of primary data 812 stored in the primary storage device(s) 804. The data agent 842 may receive control information from the storage manager 840, such as commands to transfer copies of data objects, metadata, and other payload data to the media agents 844.

In some embodiments, a data agent 842 may be distributed between the client computing device 802 and storage manager 840 (and any other intermediate components) or may be deployed from a remote location or its functions approximated by a remote process that performs some or all of the functions of data agent 842. In addition, a data agent 842 may perform some functions provided by a media agent 844, or may perform other functions such as encryption and deduplication.

As indicated, each data agent 842 may be specialized for a particular application 810, and the system can employ multiple application-specific data agents 842, each of which may perform information management operations (e.g., perform backup, migration, and data recovery) associated with a different application 810. For instance, different individual data agents 842 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 802 has two or more types of data, one data agent 842 may be used for each data type to copy, archive, migrate, and restore the client computing device 802 data. For example, to backup, migrate, and restore all of the data on a Microsoft Exchange server, the client computing device 802 may use one Microsoft Exchange Mailbox data agent 842 to backup the Exchange mailboxes, one Microsoft Exchange Database data agent 842 to backup the Exchange databases, one Microsoft Exchange Public Folder data agent 842 to backup the Exchange Public Folders, and one Microsoft Windows File System data agent 842 to backup the file system of the client computing device 802. In such embodiments, these data agents 842 may be treated as four separate data agents 842 even though they reside on the same client computing device 802.

Other embodiments may employ one or more generic data agents 842 that can handle and process data from two or more different applications 810, or that can handle and process multiple data types, instead of or in addition to using specialized data agents 842. For example, one generic data agent 842 may be used to back up, migrate and restore Microsoft Exchange Mailbox data and Microsoft Exchange Database data while another generic data agent may handle Microsoft Exchange Public Folder data and Microsoft Windows File System data.

Each data agent 842 may be configured to access data and/or metadata stored in the primary storage device(s) 804 associated with the data agent 842 and process the data as appropriate. For example, during a secondary copy operation, the data agent 842 may arrange or assemble the data and metadata into one or more files having a certain format (e.g., a particular backup or archive format) before transferring the file(s) to a media agent 844 or other component. The file(s) may include a list of files or other metadata. Each data agent 842 can also assist in restoring data or metadata to primary storage devices 804 from a secondary copy 816. For instance, the data agent 842 may operate in conjunction with the storage manager 840 and one or more of the media agents 844 to restore data from secondary storage device(s) 808.

Media Agents

As indicated above with respect to FIG. 8A, off-loading certain responsibilities from the client computing devices 802 to intermediate components such as the media agent(s) 844 can provide a number of benefits including improved client computing device 802 operation, faster secondary copy operation performance, and enhanced scalability. As one specific example which will be discussed below in further detail, the media agent 844 can act as a local cache of copied data and/or metadata that it has stored to the secondary storage device(s) 808, providing improved restore capabilities.

Generally speaking, a media agent 844 may be implemented as a software module that manages, coordinates, and facilitates the transmission of data, as directed by the storage manager 840, between a client computing device 802 and one or more secondary storage devices 808. Whereas the storage manager 840 controls the operation of the information management system 800, the media agent 844 generally provides a portal to secondary storage devices 808. For instance, other components in the system interact with the media agents 844 to gain access to data stored on the secondary storage devices 808, whether it be for the purposes of reading, writing, modifying, or deleting data. Moreover, as will be described further, media agents 844 can generate and store information relating to characteristics of the stored data and/or metadata, or can generate and store other types of information that generally provides insight into the contents of the secondary storage devices 808.

Media agents 844 can comprise separate nodes in the information management system 800 (e.g., nodes that are separate from the client computing devices 802, storage manager 840, and/or secondary storage devices 808). In general, a node within the information management system 800 can be a logically and/or physically separate component, and in some cases is a component that is individually addressable or otherwise identifiable. In addition, each media agent 844 may reside on a dedicated secondary storage computing device 806 in some cases, while in other embodiments a plurality of media agents 844 reside on the same secondary storage computing device 806.

A media agent 844 (and corresponding media agent database 852) may be considered to be "associated with" a particular secondary storage device 808 if that media agent 844 is capable of one or more of: routing and/or storing data to the particular secondary storage device 808, coordinating the routing and/or storing of data to the particular secondary storage device 808, retrieving data from the particular secondary storage device 808, coordinating the retrieval of data from a particular secondary storage device 808, and modifying and/or deleting data retrieved from the particular secondary storage device 808.

While media agent(s) 844 are generally associated with one or more secondary storage devices 808, one or more media agents 844 in certain embodiments are physically separate from the secondary storage devices 808. For instance, the media agents 844 may reside on secondary storage computing devices 806 having different housings or packages than the secondary storage devices 808. In one example, a media agent 844 resides on a first server computer and is in communication with a secondary storage device(s) 808 residing in a separate, rack-mounted RAID-based system.

Where the information management system 800 includes multiple media agents 844 (FIG. 8D), a first media agent 844 may provide failover functionality for a second, failed media agent 844. In addition, media agents 844 can be dynamically selected for storage operations to provide load balancing. Failover and load balancing are described in greater detail below.

In operation, a media agent 844 associated with a particular secondary storage device 808 may instruct the secondary storage device 808 to perform an information management operation. For instance, a media agent 844 may instruct a tape library to use a robotic arm or other retrieval means to load or eject a certain storage media, and to subsequently archive, migrate, or retrieve data to or from that media, e.g., for the purpose of restoring the data to a client computing device 802. As another example, a secondary storage device 808 may include an array of hard disk drives or solid state drives organized in a RAID configuration, and the media agent 844 may forward a logical unit number (LUN) and other appropriate information to the array, which uses the received information to execute the desired storage operation. The media agent 844 may communicate with a secondary storage device 808 via a suitable communications link, such as a SCSI or Fiber Channel link.

As shown, each media agent 844 may maintain an associated media agent database 852. The media agent database 852 may be stored in a disk or other storage device (not shown) that is local to the secondary storage computing device 806 on which the media agent 844 resides. In other cases, the media agent database 852 is stored remotely from the secondary storage computing device 806.

The media agent database 852 can include, among other things, an index 853 including data generated during secondary copy operations and other storage or information management operations. The index 853 provides a media agent 844 or other component with a fast and efficient mechanism for locating secondary copies 816 or other data stored in the secondary storage devices 808. In some cases, the index 853 does not form a part of and is instead separate from the media agent database 852.

A media agent index 853 or other data structure associated with the particular media agent 844 may include information about the stored data. For instance, for each secondary copy 816, the index 853 may include metadata such as a list of the data objects (e.g., files/subdirectories, database objects, mailbox objects, etc.), a path to the secondary copy 816 on the corresponding secondary storage device 808, location information indicating where the data objects are stored in the secondary storage device 808, when the data objects were created or modified, etc. Thus, the index 853 includes metadata associated with the secondary copies 816 that is readily available for use in storage operations and other activities without having to be first retrieved from the secondary storage device 808. In yet further embodiments, some or all of the data in the index 853 may instead or additionally be stored along with the data in a secondary storage device 808, e.g., with a copy of the index 853. In some embodiments, the secondary storage devices 808 can include sufficient information to perform a "bare metal restore", where the operating system of a failed client computing device 802 or other restore target is automatically rebuilt as part of a restore operation.

Because the index 853 maintained in the media agent database 852 may operate as a cache, it can also be referred to as "an index cache." In such cases, information stored in the index cache 853 typically comprises data that reflects certain particulars about storage operations that have occurred relatively recently. After some triggering event, such as after a certain period of time elapses, or the index cache 853 reaches a particular size, the index cache 853 may be copied or migrated to a secondary storage device(s) 808. This information may need to be retrieved and uploaded back into the index cache 853 or otherwise restored to a media agent 844 to facilitate retrieval of data from the secondary storage device(s) 808. In some embodiments, the cached information may include format or containerization information related to archives or other files stored on the storage device(s) 808. In this manner, the index cache 853 allows for accelerated restores.

In some alternative embodiments the media agent 844 generally acts as a coordinator or facilitator of storage operations between client computing devices 802 and corresponding secondary storage devices 808, but does not actually write the data to the secondary storage device 808. For instance, the storage manager 840 (or the media agent 844) may instruct a client computing device 802 and secondary storage device 808 to communicate with one another directly. In such a case the client computing device 802 transmits the data directly or via one or more intermediary components to the secondary storage device 808 according to the received instructions, and vice versa. In some such cases, the media agent 844 may still receive, process, and/or maintain metadata related to the storage operations. Moreover, in these embodiments, the payload data can flow through the media agent 844 for the purposes of populating the index cache 853 maintained in the media agent database 852, but not for writing to the secondary storage device 808.

The media agent 844 and/or other components such as the storage manager 840 may in some cases incorporate additional functionality, such as data classification, content indexing, deduplication, encryption, compression, and the like. Further details regarding these and other functions are described below.

Distributed, Scalable Architecture

As described, certain functions of the information management system 800 can be distributed amongst various physical and/or logical components in the system. For instance, one or more of the storage manager 840, data agents 842, and media agents 844 may reside on computing devices that are physically separate from one another. This architecture can provide a number of benefits.

For instance, hardware and software design choices for each distributed component can be targeted to suit its particular function. The secondary computing devices 806 on which the media agents 844 reside can be tailored for interaction with associated secondary storage devices 808 and provide fast index cache operation, among other specific tasks. Similarly, the client computing device(s) 802 can be selected to effectively service the applications 810 residing thereon, in order to efficiently produce and store primary data 872.

Moreover, in some cases, one or more of the individual components in the information management system 800 can be distributed to multiple, separate computing devices. As one example, for large file systems where the amount of data stored in the database 846 is relatively large, the database 846 may be migrated to or otherwise reside on a specialized database server (e.g., an SQL server) separate from a server that implements the other functions of the storage manager 840. This configuration can provide added protection because the database 846 can be protected with standard database utilities (e.g., SQL log shipping or database replication) independent from other functions of the storage manager 840. The database 846 can be efficiently replicated to a remote site for use in the event of a disaster or other data loss incident at the primary site. Or the database 846 can be replicated to another computing device within the same site, such as to a higher performance machine in the event that a storage manager host device can no longer service the needs of a growing information management system 800.

Figure 8D:
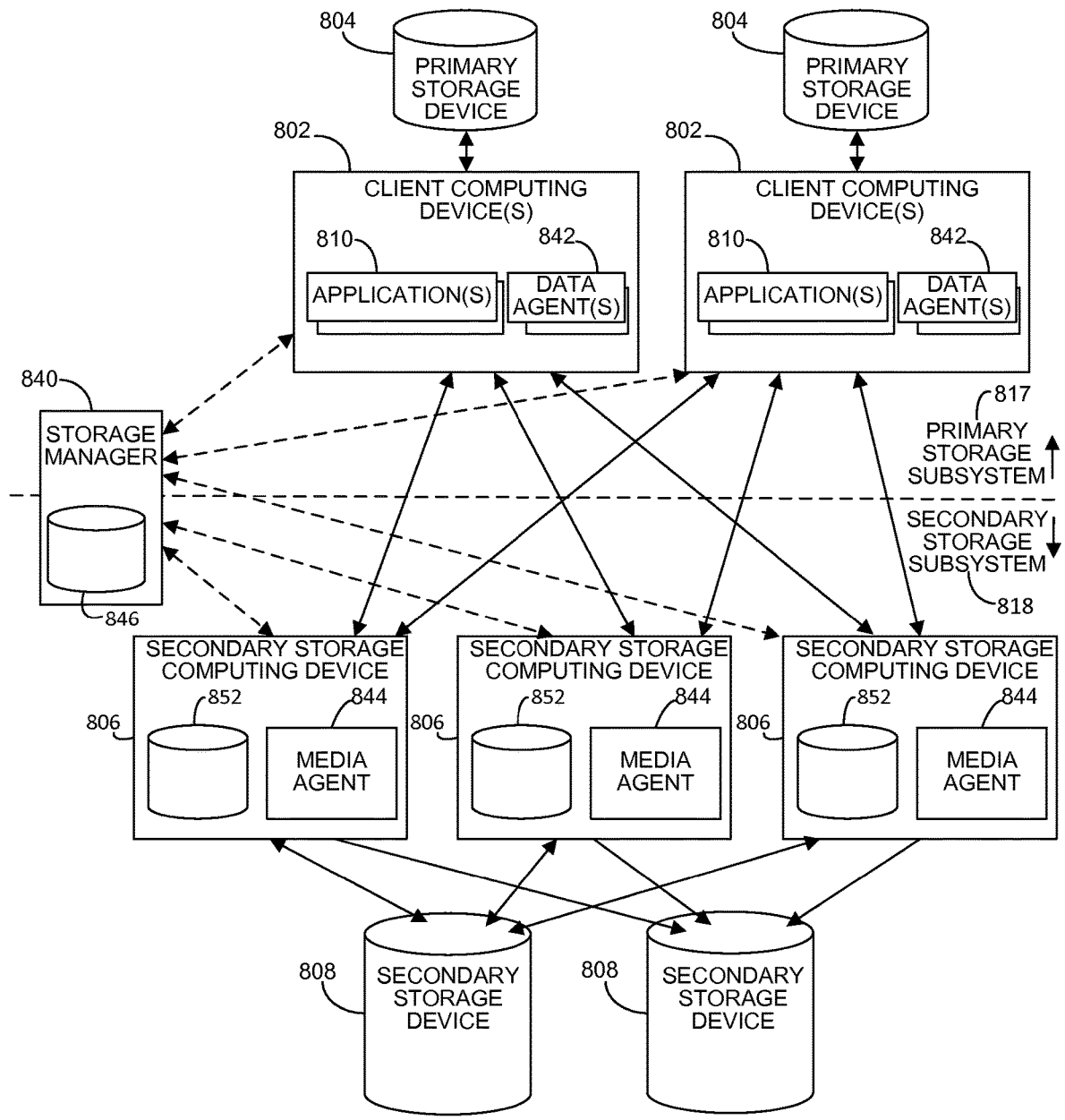
FIG. 8D is a block diagram illustrating a scalable information management system.

The distributed architecture also provides both scalability and efficient component utilization. FIG. 8D shows an embodiment of the information management system 800 including a plurality of client computing devices 802 and associated data agents 842 as well as a plurality of secondary storage computing devices 806 and associated media agents 844.

Additional components can be added or subtracted based on the evolving needs of the information management system 800. For instance, depending on where bottlenecks are identified, administrators can add additional client computing devices 802, secondary storage computing devices 806 (and corresponding media agents 844), and/or secondary storage devices 808. Moreover, where multiple fungible components are available, load balancing can be implemented to dynamically address identified bottlenecks. As an example, the storage manager 840 may dynamically select which media agents 844 and/or secondary storage devices 808 to use for storage operations based on a processing load analysis of the media agents 844 and/or secondary storage devices 808, respectively.

Moreover, each client computing device 802 in some embodiments can communicate with, among other components, any of the media agents 844, e.g., as directed by the storage manager 840. And each media agent 844 may be able to communicate with, among other components, any of the secondary storage devices 808, e.g., as directed by the storage manager 840. Thus, operations can be routed to the secondary storage devices 808 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 842 and the storage manager 840 reside on the same client computing device 802. In another embodiment, one or more data agents 842 and one or more media agents 844 reside on a single computing device.

Exemplary Types of Information Management Operations

In order to protect and leverage stored data, the information management system 800 can be configured to perform a variety of information management operations. As will be described, these operations can generally include secondary copy and other data movement operations, processing and data manipulation operations, analysis, reporting, and management operations. The operations described herein may be performed on any type of computing platform, e.g., between two computers connected via a LAN, to a mobile client telecommunications device connected to a server via a WLAN, to any manner of client device coupled to a cloud storage target.

Data Movement Operations

Data movement operations according to certain embodiments are generally operations that involve the copying or migration of data (e.g., payload data) between different locations in the information management system 800 in an original/native and/or one or more different formats. For example, data movement operations can include operations in which stored data is copied, migrated, or otherwise transferred from one or more first storage devices to one or more second storage devices, such as from primary storage device(s) 804 to secondary storage device(s) 808, from secondary storage device(s) 808 to different secondary storage device(s) 808, from secondary storage devices 808 to primary storage devices 804, or from primary storage device(s) 804 to different primary storage device(s) 804.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 812 at a particular point in time. Each subsequent backup copy may be maintained independently of the first. Further, a backup copy in some embodiments is generally stored in a form that is different than the native format, e.g., a backup format. This can be in contrast to the version in primary data 812 from which the backup copy is derived, and which may instead be stored in a native format of the source application(s) 810. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 812, and may be stored on media with slower retrieval times than primary data 812 and certain other types of secondary copies 816. On the other hand, backups may have relatively shorter retention periods than some other types of secondary copies 816, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 800 may generally track changes to individual files at the file-level, and includes copies of files in the backup copy. In the case of a block-level backup, files are broken into constituent blocks, and changes are tracked at the block-level. Upon restore, the information management system 800 reassembles the blocks into files in a transparent fashion.

Far less data may actually be transferred and copied to the secondary storage devices 808 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 812 and also maintaining backup copies in secondary storage device(s) 808, they can consume significant storage capacity. To help reduce storage consumption, an archive operation according to certain embodiments creates a secondary copy 816 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 812 or a secondary copy 816, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 812 is archived, in some cases the archived primary data 812 or a portion thereof is deleted when creating the archive copy. Thus, archiving can serve the purpose of freeing up space in the primary storage device(s) 804. Similarly, when a secondary copy 816 is archived, the secondary copy 816 may be deleted, and an archive copy can therefore serve the purpose of freeing up space in secondary storage device(s) 808. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 812 at a given point in time, and may include state and/or status information relative to an application that creates/manages the data. In one embodiment, a snapshot may generally capture the directory structure of an object in primary data 812 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 804 or a secondary storage device 808) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 800. In this manner, In this manner, hardware snapshots can off-load other components of information management system 800 from processing involved in snapshot creation and management.

A "software snapshot" (or "software-based snapshot") operation, on the other hand, can be a snapshot operation in which one or more other components in information management system 800 (e.g., client computing devices 802, data agents 842, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or an application. In some other cases, the snapshot may be created at the block-level, such as where creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

Once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually later modified. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 812 from a snapshot taken at a given point in time, users may also return the current file system to the state of the file system that existed when the snapshot was taken.

Replication Operations

Another type of secondary copy operation is a replication operation. Some types of secondary copies 816 are used to periodically capture images of primary data 812 at particular points in time (e.g., backups, archives, and snapshots). However, it can also be useful for recovery purposes to protect primary data 812 in a more continuous fashion, by replicating the primary data 812 substantially as changes occur. In some cases a replication copy can be a mirror copy, for instance, where changes made to primary data 812 are mirrored or substantially immediately copied to another location (e.g., to secondary storage device(s) 808). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 812. This feature allows the system to directly access, copy, restore, backup or otherwise manipulate the replication copies as if the data was the "live", primary data 812. This can reduce access time, storage utilization, and impact on source applications 810, among other benefits.

Based on known good state information, the information management system 800 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 800 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 800 utilizes a technique for dynamically aligning deduplication blocks (e.g., fixed-length blocks) based on changing content in the data stream, as described in U.S. Pat. No. 8,364,652, which is incorporated by reference herein.

The information management system 800 can perform deduplication in a variety of manners at a variety of locations in the information management system 800. For instance, in some embodiments, the information management system 800 implements "target-side" deduplication by deduplicating data (e.g., secondary copies 816) stored in the secondary storage devices 808. In some such cases, the media agents 844 are generally configured to manage the deduplication process. For instance, one or more of the media agents 844 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 844 and the client computing device(s) 802 and/or reduce redundant data stored in the primary storage devices 804. According to various implementations, one or more of the storage devices of the target-side, source-side, or client-side of an operation can be cloud-based storage devices. Thus, the target-side, source-side, and/or client-side deduplication can be cloud-based deduplication. In particular, as discussed previously, the storage manager 840 may communicate with other components within the information management system 800 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 804 to secondary storage devices 808, or between tiers of secondary storage devices 808. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 812 or a secondary copy 816 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 804 (or other source storage device, such as a secondary storage device 808) to replace the deleted data in primary data 812 (or other source copy) and to point to or otherwise indicate the new location in a secondary storage device 808.

According to one example, files are generally moved between higher and lower cost storage depending on how often the files are accessed. When a user requests access to the HSM data that has been removed or migrated, the information management system 800 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 804). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 816. For instance, an initial secondary copy 816 may be generated using or otherwise be derived from primary data 812 (or other data residing in the secondary storage subsystem 818), whereas an auxiliary copy is generated from the initial secondary copy 816. Auxiliary copies can be used to create additional standby copies of data and may reside on different secondary storage devices 808 than the initial secondary copies 816. Thus, auxiliary copies can be used for recovery purposes if initial secondary copies 816 become unavailable. Exemplary compatible auxiliary copy techniques are described in further detail in U.S. Pat. No. 8,230,195, which is incorporated by reference herein.

The information management system 800 may also perform disaster recovery operations that make or retain disaster recovery copies, often as secondary, high-availability disk copies. The information management system 800 may create secondary disk copies and store the copies at disaster recovery locations using auxiliary copy or replication operations, such as continuous data replication technologies. Depending on the particular data protection goals, disaster recovery locations can be remote from the client computing devices 802 and primary storage devices 804, remote from some or all of the secondary storage devices 808, or both.

Data Analysis, Reporting, and Management Operations

Data analysis, reporting, and management operations can be different than data movement operations in that they do not necessarily involve the copying, migration or other transfer of data (e.g., primary data 812 or secondary copies 816) between different locations in the system. For instance, data analysis operations may involve processing (e.g., offline processing) or modification of already stored primary data 812 and/or secondary copies 816. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 800 analyzes and indexes characteristics, content, and metadata associated with the data stored within the primary data 812 and/or secondary copies 816, providing enhanced search and management capabilities for data discovery and other purposes. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 800 generally organizes and catalogues the results in a content index, which may be stored within the media agent database 852, for example. The content index can also include the storage locations of (or pointer references to) the indexed data in the primary data 812 or secondary copies 816, as appropriate. The results may also be stored, in the form of a content index database or otherwise, elsewhere in the information management system 800 (e.g., in the primary storage devices 804, or in the secondary storage device 808). Such index data provides the storage manager 840 or another component with an efficient mechanism for locating primary data 812 and/or secondary copies 816 of data objects that match particular criteria.

For instance, search criteria can be specified by a user through user interface 858 of the storage manager 840. In some cases, the information management system 800 analyzes data and/or metadata in secondary copies 816 to create an "off-line" content index, without significantly impacting the performance of the client computing devices 802. Depending on the embodiment, the system can also implement "on-line" content indexing, e.g., of primary data 812. Examples of compatible content indexing techniques are provided in U.S. Pat. No. 8,170,995, which is incorporated by reference herein.

In order to further leverage the data stored in the information management system 800 to perform these and other tasks, one or more components can be configured to scan data and/or associated metadata for classification purposes to populate a database (or other data structure) of information (which can be referred to as a "data classification database" or a "metabase"). Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 800. As an example, there may be a first centralized metabase associated with the primary storage subsystem 817 and a second centralized metabase associated with the secondary storage subsystem 818. In other cases, there may be one or more metabases associated with individual components. For instance, there may be a dedicated metabase associated with some or all of the client computing devices 802 and/or media agents 844. In some embodiments, a data classification database may reside as one or more data structures within management database 846, or may be otherwise associated with storage manager 840.

In some cases, the metabase(s) may be included in separate database(s) and/or on separate storage device(s) from primary data 812 and/or secondary copies 816, such that operations related to the metabase do not significantly impact performance on other components in the information management system 800. In other cases, the metabase(s) may be stored along with primary data 812 and/or secondary copies 816. Files or other data objects can be associated with identifiers (e.g., tag entries, etc.) in the media agent 844 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 800 in some cases is configured to process data (e.g., files or other data objects, secondary copies 816, etc.), according to an appropriate encryption algorithm (e.g., Blowfish, Advanced Encryption Standard [AES], Triple Data Encryption Standard [3-DES], etc.) to limit access and provide data security in the information management system 800.

The information management system 800 in some cases encrypts the data at the client level, such that the client computing devices 802 (e.g., the data agents 842) encrypt the data prior to forwarding the data to other components, e.g., before sending the data to media agents 844 during a secondary copy operation. In such cases, the client computing device 802 may maintain or have access to an encryption key or passphrase for decrypting the data upon restore. Encryption can also occur when creating copies of secondary copies, e.g., when creating auxiliary copies or archive copies. In yet further embodiments, the secondary storage devices 808 can implement built-in, high performance hardware encryption.

Management and Reporting Operations

Certain embodiments leverage the integrated, ubiquitous nature of the information management system 800 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 800 by, without limitation, performing error tracking, generating granular storage/performance metrics (e.g., job success/failure information, deduplication efficiency, etc.), generating storage modeling and costing information, and the like.

As an example, a storage manager 840 or other component in the information management system 800 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 840 may track the status of a set of associated storage operation cells in a hierarchy of information management cells, such as the status of jobs, system components, system resources, and other items, by communicating with storage managers 840 (or other components) in the respective storage operation cells. Moreover, the master storage manager 840 may track the status of its associated storage operation cells and associated information management operations by receiving periodic status updates from the storage managers 840 (or other components) in the respective cells regarding jobs, system components, system resources, and other items. In some embodiments, a master storage manager 840 may store status information and other information regarding its associated storage operation cells and other system information in its index 850 (or other location).

The master storage manager 840 or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 812 should be migrated to a secondary storage device 808 to free space on the primary storage device 804. Examples of the use of risk factors and other triggering criteria are described in U.S. Pat. No. 7,343,453, which is incorporated by reference herein.

In some embodiments, the system 800 may also determine whether a metric or other indication satisfies a particular storage criteria and, if so, perform an action. For example, as previously described, a storage policy or other definition might indicate that a storage manager 840 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 800 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 858 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 858 can include an option to show a "virtual view" of the system that graphically depicts the various components in the system using appropriate icons. As one example, the user interface 858 may provide a graphical depiction of one or more primary storage devices 804, the secondary storage devices 808, data agents 842 and/or media agents 844, and their relationship to one another in the information management system 800. The operations management functionality can facilitate planning and decision-making. For example, in some embodiments, a user may view the status of some or all jobs as well as the status of each component of the information management system 800. Users may then plan and make decisions based on this data. For instance, a user may view high-level information regarding storage operations for the information management system 800, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 800 can also be configured to perform system-wide e-discovery operations in some embodiments. In general, e-discovery operations provide a unified collection and search capability for data in the system, such as data stored in the secondary storage devices 808 (e.g., backups, archives, or other secondary copies 816). For example, the information management system 800 may construct and maintain a virtual repository for data stored in the information management system 800 that is integrated across source applications 810, different storage device types, etc. According to some embodiments, e-discovery utilizes other techniques described herein, such as data classification and/or content indexing.

Information Management Policies

As indicated previously, an information management policy 848 can include a data structure or other information source that specifies a set of parameters (e.g., criteria and rules) associated with secondary copy or other information management operations.

One type of information management policy 848 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 808 includes a group of disk libraries, the storage policy may specify a particular disk library for storing the sub-clients associated with the policy. As another example, where the secondary storage devices 808 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 808 or a media agent 844), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 844 for conveying data (e.g., one or more sub-clients) associated with the storage policy between the source (e.g., one or more host client computing devices 802) and destination (e.g., a particular target secondary storage device 808).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 848 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 802, and the like. In one configuration, a separate scheduling policy is maintained for particular logical groupings of data on a client computing device 802. The scheduling policy specifies that those logical groupings are to be moved to secondary storage devices 808 every hour according to storage policies associated with the respective sub-clients.

When adding a new client computing device 802, administrators can manually configure information management policies 848 and/or other settings, e.g., via the user interface 858. However, this can be an involved process resulting in delays, and it may be desirable to begin data protecting operations quickly.

Thus, in some embodiments, the information management system 800 automatically applies a default configuration to client computing device 802. As one example, when one or more data agent(s) 842 are installed on one or more client computing devices 802, the installation script may register the client computing device 802 with the storage manager 840, which in turn applies the default configuration to the new client computing device 802. In this manner, data protection operations can begin substantially immediately. The default configuration can include a default storage policy, for example, and can specify any appropriate information sufficient to begin data protection operations. This can include a type of data protection operation, scheduling information, a target secondary storage device 808, data path information (e.g., a particular media agent 844), and the like.

Other types of information management policies 848 are possible. For instance, the information management policies 848 can also include one or more audit or security policies. An audit policy is a set of preferences, rules and/or criteria that protect sensitive data in the information management system 800. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 804 instead. To facilitate this approval, the audit policy may further specify how a secondary storage computing device 806 or other system component should notify a reviewer that a sensitive object is slated for transfer.

In some implementations, the information management policies 848 may include one or more provisioning policies. A provisioning policy can include a set of preferences, priorities, rules, and/or criteria that specify how client computing devices 802 (or groups thereof) may utilize system resources, such as available storage on cloud storage and/or network bandwidth. A provisioning policy specifies, for example, data quotas for particular client computing devices 802 (e.g., a number of gigabytes that can be stored monthly, quarterly or annually). The storage manager 840 or other components may enforce the provisioning policy. For instance, the media agents 844 may enforce the policy when transferring data to secondary storage devices 808. If a client computing device 802 exceeds a quota, a budget for the client computing device 802 (or associated department) is adjusted accordingly or an alert may trigger.

While the above types of information management policies 848 have been described as separate policies, one or more of these can be generally combined into a single information management policy 848. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 848 may specify:

- schedules or other timing information, e.g., specifying when and/or how often to perform information management operations;
- the type of copy 816 (e.g., type of secondary copy) and/or copy format (e.g., snapshot, backup, archive, HSM, etc.);
- a location or a class or quality of storage for storing secondary copies 816 (e.g., one or more particular secondary storage devices 808);
- preferences regarding whether and how to encrypt, compress, deduplicate, or otherwise modify or transform secondary copies 816;
- which system components and/or network pathways (e.g., preferred media agents 844) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 812 and/or secondary copies 816 should be retained, e.g., in a particular class or tier of storage devices, or within the information management system 800.

Policies can additionally specify or depend on a variety of historical or current criteria that may be used to determine which rules to apply to a particular data object, system component, or information management operation, such as:

- frequency with which primary data 812 or a secondary copy 816 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 808);
- the identity of users, applications 810, client computing devices 802 and/or other computing devices that created, accessed, modified, or otherwise utilized primary data 812 or secondary copies 816;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 8E:
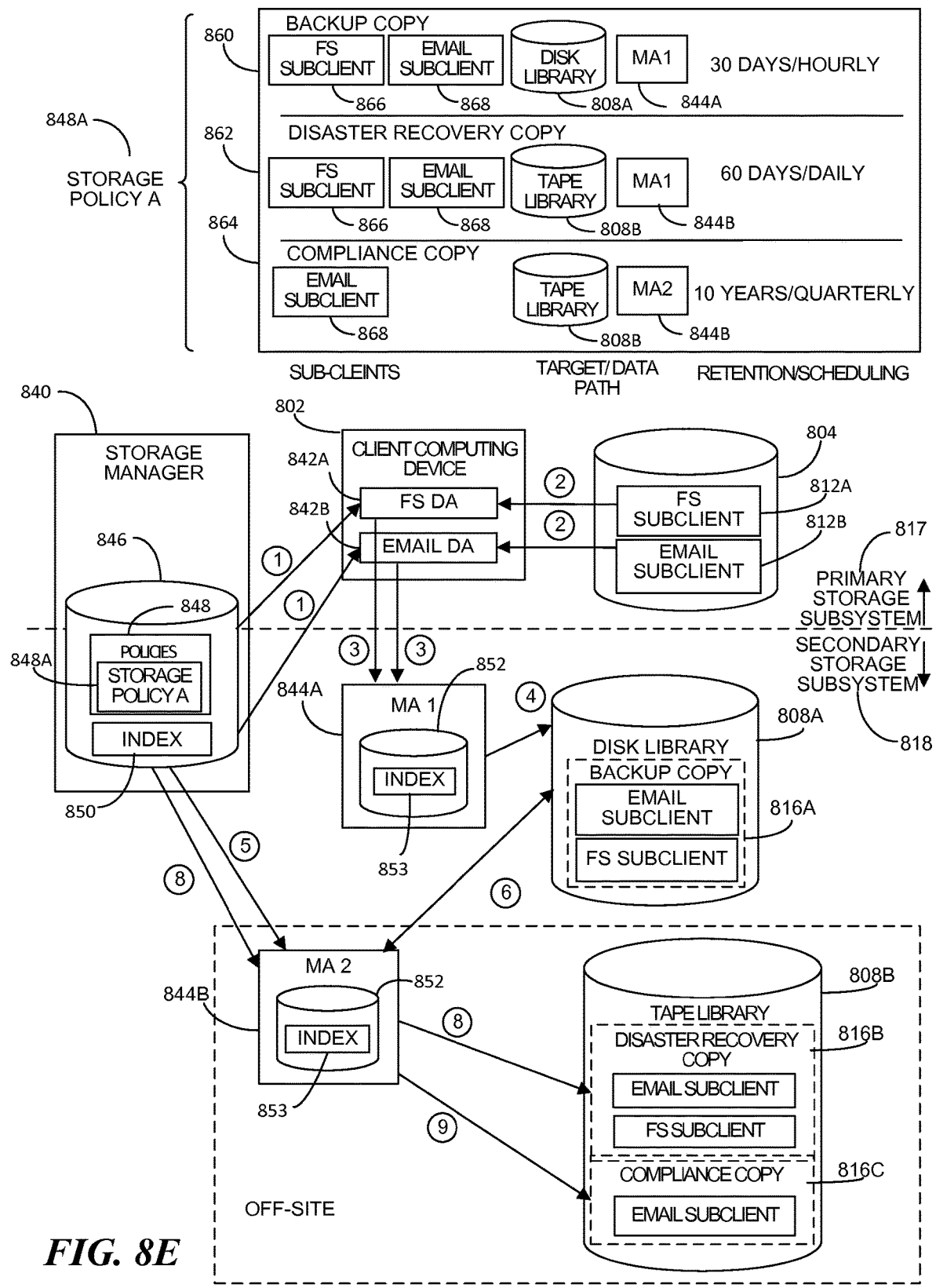
FIG. 8E illustrates certain secondary copy operations according to an exemplary storage policy.

FIG. 8E shows a data flow data diagram depicting performance of storage operations by an embodiment of an information management system 800, according to an exemplary storage policy 848A. The information management system 800 includes a storage manger 840, a client computing device 802 having a file system data agent 842A and an email data agent 842B residing thereon, a primary storage device 804, two media agents 844A, 844B, and two secondary storage devices 808A, 808B: a disk library 808A and a tape library 808B. As shown, the primary storage device 804 includes primary data 812A, 812B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 8E can be utilized in conjunction with data that is organized in a variety of other manners.

As indicated by the dashed box, the second media agent 844B and the tape library 808B are "off-site", and may therefore be remotely located from the other components in the information management system 800 (e.g., in a different city, office building, etc.). Indeed, "off-site" may refer to a magnetic tape located in storage, which must be manually retrieved and loaded into a tape drive to be read. In this manner, information stored on the tape library 808B may provide protection in the event of a disaster or other failure.

The file system sub-client and its associated primary data 812A in certain embodiments generally comprise information generated by the file system and/or operating system of the client computing device 802, and can include, for example, file system data (e.g., regular files, file tables, mount points, etc.), operating system data (e.g., registries, event logs, etc.), and the like. The e-mail sub-client, on the other hand, and its associated primary data 812B, include data generated by an e-mail client application operating on the client computing device 802, and can include mailbox information, folder information, emails, attachments, associated database information, and the like. As described above, the sub-clients can be logical containers, and the data included in the corresponding primary data 812A, 812B may or may not be stored contiguously.

The exemplary storage policy 848A includes backup copy preferences or rule set 860, disaster recovery copy preferences rule set 862, and compliance copy preferences or rule set 864. The backup copy rule set 860 specifies that it is associated with a file system sub-client 866 and an email sub-client 868. Each of these sub-clients 866, 868 are associated with the particular client computing device 802. The backup copy rule set 860 further specifies that the backup operation will be written to the disk library 808A, and designates a particular media agent 844A to convey the data to the disk library 808A. Finally, the backup copy rule set 860 specifies that backup copies created according to the rule set 860 are scheduled to be generated on an hourly basis and to be retained for 30 days. In some other embodiments, scheduling information is not included in the storage policy 848A, and is instead specified by a separate scheduling policy.

The disaster recovery copy rule set 862 is associated with the same two sub-clients 866, 868. However, the disaster recovery copy rule set 862 is associated with the tape library 808B, unlike the backup copy rule set 860. Moreover, the disaster recovery copy rule set 862 specifies that a different media agent 844B than the media agent 844A associated with the backup copy rule set 860 will be used to convey the data to the tape library 808B. As indicated, disaster recovery copies created according to the rule set 862 will be retained for 60 days, and will be generated on a daily basis. Disaster recovery copies generated according to the disaster recovery copy rule set 862 can provide protection in the event of a disaster or other data-loss event that would affect the backup copy 816A maintained on the disk library 808A.

The compliance copy rule set 864 is only associated with the email sub-client 868, and not the file system sub-client 866. Compliance copies generated according to the compliance copy rule set 864 will therefore not include primary data 812A from the file system sub-client 866. For instance, the organization may be under an obligation to store and maintain copies of email data for a particular period of time (e.g., 10 years) to comply with state or federal regulations, while similar regulations do not apply to the file system data. The compliance copy rule set 864 is associated with the same tape library 808B and media agent 844B as the disaster recovery copy rule set 862, although a different storage device or media agent could be used in other embodiments. Finally, the compliance copy rule set 864 specifies that copies generated under the compliance copy rule set 864 will be retained for 10 years, and will be generated on a quarterly basis.

At step 1, the storage manager 840 initiates a backup operation according to the backup copy rule set 860. For instance, a scheduling service running on the storage manager 840 accesses scheduling information from the backup copy rule set 860 or a separate scheduling policy associated with the client computing device 802, and initiates a backup copy operation on an hourly basis. Thus, at the scheduled time slot the storage manager 840 sends instructions to the client computing device 802 to begin the backup operation.

At step 2, the file system data agent 842A and the email data agent 842B residing on the client computing device 802 respond to the instructions received from the storage manager 840 by accessing and processing the primary data 812A, 812B involved in the copy operation from the primary storage device 804. Because the operation is a backup copy operation, the data agent(s) 842A, 842B may format the data into a backup format or otherwise process the data.

At step 3, the client computing device 802 communicates the retrieved, processed data to the first media agent 844A, as directed by the storage manager 840, according to the backup copy rule set 860. In some other embodiments, the information management system 800 may implement a load-balancing, availability-based, or other appropriate algorithm to select from the available set of media agents 844A, 844B. Regardless of the manner the media agent 844A is selected, the storage manager 840 may further keep a record in the storage manager database 846 of the association between the selected media agent 844A and the client computing device 802 and/or between the selected media agent 844A and the backup copy 816A.

The target media agent 844A receives the data from the client computing device 802, and at step 4 conveys the data to the disk library 808A to create the backup copy 816A, again at the direction of the storage manager 840 and according to the backup copy rule set 860. The secondary storage device 808A can be selected in other ways. For instance, the media agent 844A may have a dedicated association with a particular secondary storage device(s), or the storage manager 840 or media agent 844A may select from a plurality of secondary storage devices, e.g., according to availability, using one of the techniques described in U.S. Pat. No. 7,246,207, which is incorporated by reference herein.

The media agent 844A can also update its index 853 to include data and/or metadata related to the backup copy 816A, such as information indicating where the backup copy 816A resides on the disk library 808A, data and metadata for cache retrieval, etc. After the 30 day retention period expires, the storage manager 840 instructs the media agent 844A to delete the backup copy 816A from the disk library 808A. The storage manager 840 may similarly update its index 850 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 840 may update its index 850 to include some or all of the information stored in the index 853 of the media agent 844A.

At step 5, the storage manager 840 initiates the creation of a disaster recovery copy 816B according to the disaster recovery copy rule set 862. For instance, at step 6, based on instructions received from the storage manager 840 at step 5, the specified media agent 844B retrieves the most recent backup copy 816A from the disk library 808A.

At step 7, again at the direction of the storage manager 840 and as specified in the disaster recovery copy rule set 862, the media agent 844B uses the retrieved data to create a disaster recovery copy 816B on the tape library 808B. In some cases, the disaster recovery copy 816B is a direct, mirror copy of the backup copy 816A, and remains in the backup format. In other embodiments, the disaster recovery copy 816B may be generated in some other manner, such as by using the primary data 812A, 812B from the primary storage device 804 as source data. The disaster recovery copy operation is initiated once a day and the disaster recovery copies 8168 are deleted after 60 days.

At step 8, the storage manager 840 initiates the creation of a compliance copy 816C, according to the compliance copy rule set 864. For instance, the storage manager 840 instructs the media agent 844B to create the compliance copy 816C on the tape library 808B at step 9, as specified in the compliance copy rule set 864. In the example, the compliance copy 816C is generated using the disaster recovery copy 816B. In other embodiments, the compliance copy 816C is instead generated using either the primary data 812B corresponding to the email sub-client or using the backup copy 816A from the disk library 808A as source data. As specified, in the illustrated example, compliance copies 816C are created quarterly, and are deleted after ten years.

While not shown in FIG. 8E, at some later point in time, a restore operation can be initiated involving one or more of the secondary copies 816A, 816B, 816C. As one example, a user may manually initiate a restore of the backup copy 816A by interacting with the user interface 858 of the storage manager 840. The storage manager 840 then accesses data in its index 850 (and/or the respective storage policy 848A) associated with the selected backup copy 816A to identify the appropriate media agent 844A and/or secondary storage device 808A.

In other cases, a media agent may be selected for use in the restore operation based on a load balancing algorithm, an availability based algorithm, or other criteria. The selected media agent 844A retrieves the data from the disk library 808A. For instance, the media agent 844A may access its index 853 to identify a location of the backup copy 816A on the disk library 808A, or may access location information residing on the disk 808A itself.

When the backup copy 816A was recently created or accessed, the media agent 844A accesses a cached version of the backup copy 816A residing in the index 853, without having to access the disk library 808A for some or all of the data. Once it has retrieved the backup copy 816A, the media agent 844A communicates the data to the source client computing device 802. Upon receipt, the file system data agent 842A and the email data agent 842B may unpackage (e.g., restore from a backup format to the native application format) the data in the backup copy 816A and restore the unpackaged data to the primary storage device 804.

Exemplary Applications of Storage Policies

The storage manager 840 may permit a user to specify aspects of the storage policy 848A. For example, the storage policy can be modified to include information governance policies to define how data should be managed in order to comply with a certain regulation or business objective. The various policies may be stored, for example, in the database 846. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization.

A classification policy defines a taxonomy of classification terms or tags relevant to a compliance task and/or business objective. A classification policy may also associate a defined tag with a classification rule. A classification rule defines a particular combination of data criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, (2) were sent to or received from outside counsel via email, and/or (3) contain one of the following keywords: "privileged" or "attorney," "counsel", or other terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input. For example, a user may define certain entity tags, such as a particular product number or project ID code that is relevant in the organization.

In some implementations, the classification policy can be implemented using cloud-based techniques. For example, the storage devices may be cloud storage devices, and the storage manager 840 may execute cloud service provider API over a network to classify data stored on cloud storage devices.

Exemplary Secondary Copy Formatting

The formatting and structure of secondary copies 816 can vary, depending on the embodiment. In some cases, secondary copies 816 are formatted as a series of logical data units or "chunks" (e.g., 512 MB, 1 GB, 2 GB, 4 GB, or 8 GB chunks). This can facilitate efficient communication and writing to secondary storage devices 808, e.g., according to resource availability. For example, a single secondary copy 816 may be written on a chunk-by-chunk basis to a single secondary storage device 808 or across multiple secondary storage devices 808. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 844, storage manager 840, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 816 on the secondary storage device 808, the chunk headers can also be stored to the index 853 of the associated media agent(s) 844 and/or the index 850. This is useful in some cases for providing faster processing of secondary copies 816 during restores or other operations. In some cases, once a chunk is successfully transferred to a secondary storage device 808, the secondary storage device 808 returns an indication of receipt, e.g., to the media agent 844 and/or storage manager 840, which may update their respective indexes 853, 850 accordingly. During restore, chunks may be processed (e.g., by the media agent 844) according to the information in the chunk header to reassemble the files.

Data can also be communicated within the information management system 800 in data channels that connect the client computing devices 802 to the secondary storage devices 808. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

FIGS. 8F and 8G are diagrams of example data streams 870 and 871, respectively, which may be employed for performing data storage operations. Referring to FIG. 8F, the data agent 842 forms the data stream 870 from the data associated with a client computing device 802 (e.g., primary data 812). The data stream 870 is composed of multiple pairs of stream header 872 and stream data (or stream payload) 874. The data streams 870 and 871 shown in the illustrated example are for a single-instanced storage operation, and a stream payload 874 therefore may include both single-instance ("SI") data and/or non-SI data. A stream header 872 includes metadata about the stream payload 874. This metadata may include, for example, a length of the stream payload 874, an indication of whether the stream payload 874 is encrypted, an indication of whether the stream payload 874 is compressed, an archive file identifier (ID), an indication of whether the stream payload 874 is single instanceable, and an indication of whether the stream payload 874 is a start of a block of data.

Referring to FIG. 8G, the data stream 871 has the stream header 872 and stream payload 874 aligned into multiple data blocks. In this example, the data blocks are of size 64 KB. The first two stream header 872 and stream payload 874 pairs comprise a first data block of size 64 KB. The first stream header 872 indicates that the length of the succeeding stream payload 874 is 63 KB and that it is the start of a data block. The next stream header 872 indicates that the succeeding stream payload 874 has a length of 1 KB and that it is not the start of a new data block. Immediately following stream payload 874 is a pair comprising an identifier header 876 and identifier data 878. The identifier header 876 includes an indication that the succeeding identifier data 878 includes the identifier for the immediately previous data block. The identifier data 878 includes the identifier that the data agent 842 generated for the data block. The data stream 871 also includes other stream header 872 and stream payload 874 pairs, which may be for SI data and/or for non-SI data.

Figure 8H:
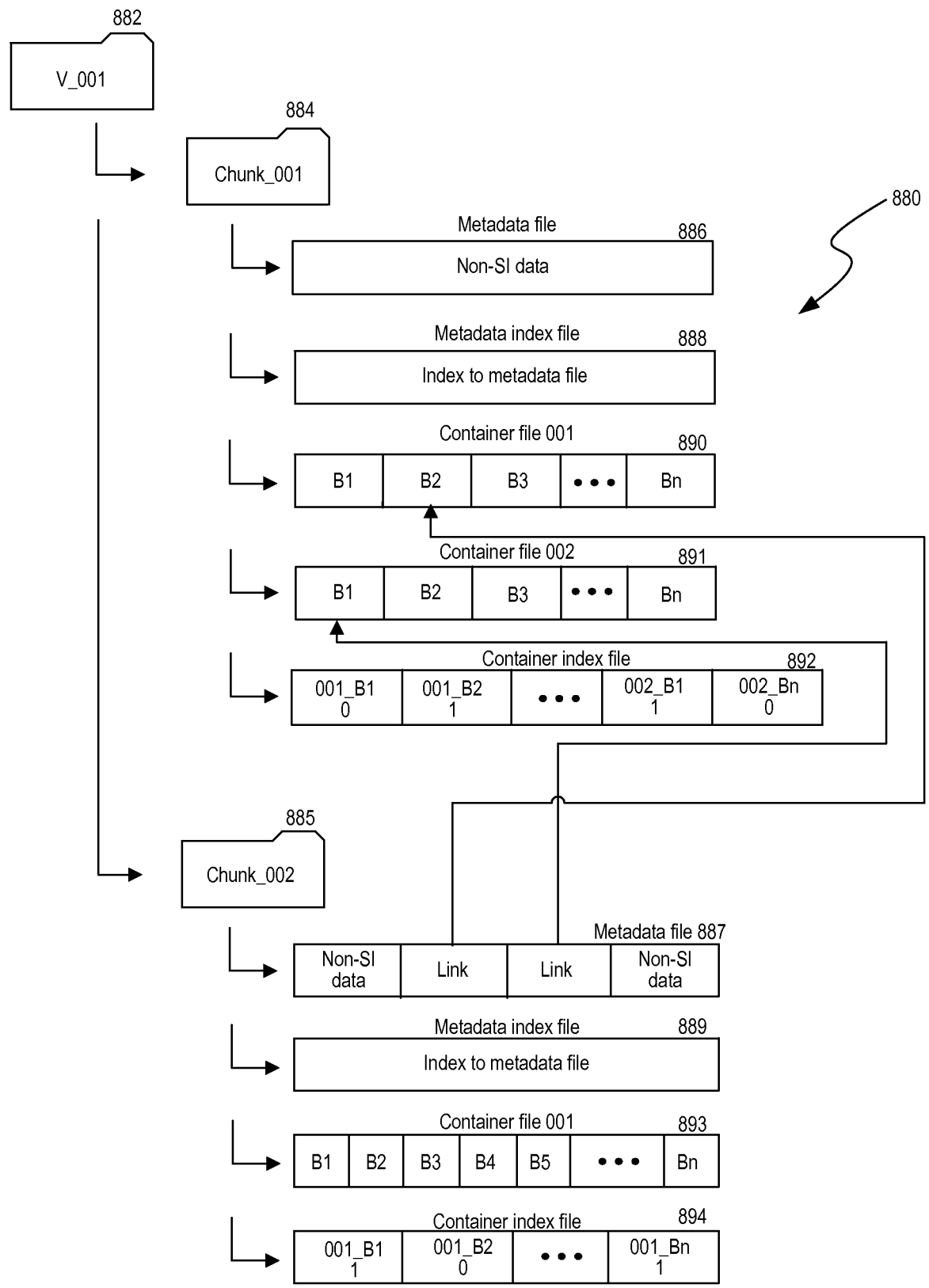

FIG. 8H is a diagram illustrating the data structures 880 that may be used to store blocks of SI data and non-SI data on the storage device (e.g., secondary storage device 808). According to certain embodiments, the data structures 880 do not form part of a native file system of the storage device. The data structures 880 include one or more volume folders 882, one or more chunk folders 884/885 within the volume folder 882, and multiple files within the chunk folder 884. Each chunk folder 884/885 includes a metadata file 886/887, a metadata index file 888/889, one or more container files 890/891/893, and a container index file 892/894. The metadata file 886/887 stores non-SI data blocks as well as links to SI data blocks stored in container files. The metadata index file 888/889 stores an index to the data in the metadata file 886/887. The container files 890/891/893 store SI data blocks. The container index file 892/894 stores an index to the container files 890/891/893. Among other things, the container index file 892/894 stores an indication of whether a corresponding block in a container file 890/891/893 is referred to by a link in a metadata file 886/887. For example, data block B2 in the container file 890 is referred to by a link in the metadata file 887 in the chunk folder 885. Accordingly, the corresponding index entry in the container index file 892 indicates that the data block B2 in the container file 890 is referred to. As another example, data block B1 in the container file 891 is referred to by a link in the metadata file 887, and so the corresponding index entry in the container index file 892 indicates that this data block is referred to.

As an example, the data structures 880 illustrated in FIG. 8H may have been created as a result of two storage operations involving two client computing devices 802. For example, a first storage operation on a first client computing device 802 could result in the creation of the first chunk folder 884, and a second storage operation on a second client computing device 802 could result in the creation of the second chunk folder 885. The container files 890/891 in the first chunk folder 884 would contain the blocks of SI data of the first client computing device 802. If the two client computing devices 802 have substantially similar data, the second storage operation on the data of the second client computing device 802 would result in the media agent 844 storing primarily links to the data blocks of the first client computing device 802 that are already stored in the container files 890/891. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 806 on which the media agent 844 resides supports sparse files, then when the media agent 844 creates container files 890/891/893, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 890/891/893 be sparse files allows the media agent 844 to free up space in the container files 890/891/893 when blocks of data in the container files 890/891/893 no longer need to be stored on the storage devices. In some examples, the media agent 844 creates a new container file 890/891/893 when a container file 890/891/893 either includes 100 blocks of data or when the size of the container file 890 exceeds 50 MB. In other examples, the media agent 844 creates a new container file 890/891/893 when a container file 890/891/893 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may be comprised in 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of providing access to secondary copies of data objects stored in an information management system, wherein the information management system manages data for multiple users within an organization, the method comprising:
    receiving search criteria from a user through a user interface provided to a user via a user computing device, wherein:
        the user interface is hosted by a storage manager of the information management system,
        the storage manager includes a computing device configured to track and schedule data management operations for primary computing devices or secondary computing devices within the information management system,
        the primary computing devices and/or secondary computing devices are associated with the multiple users within the organization,
        scheduled data management operations include creating the secondary copies of data objects with the secondary computing devices, from primary copies of data objects generated by the primary computing devices,
        the data objects include personal data objects that include content with a tag indicating that the content is of a personal nature with reference to the user, and include non-personal data objects that include content with a tag indicating that the content relates to a business or an employer of the user and that the content is not of a personal nature with reference to the user,
        at least a subset of the personal data objects and a subset of the non-personal data objects are both stored on a same primary computing device,
        the user cannot perform administrative operations on the nonpersonal data objects;
    searching the information management system, with the storage manager, for data objects that match the search criteria, wherein:
        searching for the data objects that match the search criteria includes searching media agent indices that store metadata for the data objects, and the metadata is stored in one or more data structures of metadata;
    displaying, via the user interface, metadata of the data objects that satisfy the criteria to enable the user to identify the data objects that satisfy the search criteria, wherein:
        displaying the metadata of the data objects includes displaying the metadata of the data objects in a hierarchical list for viewing by the user, wherein:
            the hierarchical list comprises at least one expandable representation of a folder, and
            the at least one expandable representation of the folder categorizes a subset of the data objects based on the metadata of the subset of the data objects;
        the metadata of the data objects includes names of the data objects or titles of the data objects provided by a person;
    retrieving content of one of the data objects, in response to the user having selected, via the user interface, the displayed metadata of the one data object;
    displaying at least part of the content of the one data object via the user interface; and
    displaying a client computing device navigator, in the user interface, to enable the user to navigate the retrieved metadata of data objects that satisfy the search criteria, with reference to the user's personal client computing devices from which a secondary copy of the data objects was created,
        wherein the client computing device navigator displays the user's personal computing devices that the user logged into to access, modify, or create one or more of the data objects that satisfy the search criteria.

2. The method of claim 1, wherein searching for the data objects that match the search criteria includes filtering out the non-personal data objects that match the search criteria and including the personal data objects that match the search criteria.

3. The method of claim 1, wherein displaying the metadata of the data objects in the hierarchical list includes displaying the metadata of the data objects without reference to a file system hierarchy and without reference to storage media on which each data object is presently stored.

4. The method of claim 1, wherein displaying the metadata of the data objects in the hierarchical list includes displaying the metadata of the data objects without regard for a file system hierarchy by which the data objects are organized within the information management system.

5. The method of claim 1, further comprising:
    providing a copy of the one of the data objects to the user for modification by the user with a client computing device; and replacing a secondary copy of the one of the data objects stored in the information management system, with a modified version of the one of the data objects.

6. The method of claim 1, further comprising:
caching copies of the data objects that satisfy the search criteria; and
deduplicating the data objects based on content of the data objects,
wherein displaying the metadata of the data objects includes displaying indications of multiple copies of deduplicated data objects.

7. The method of claim 1, further comprising:
displaying data management menus to the user with the user interface to enable the user to set or adjust data storage policies or data retention policies associated with one or more client devices assigned to the user within the information management system.

8. The method of claim 1, further comprising:
displaying data management menus to the user with the user interface to enable the user to set or adjust data storage policies or data retention policies associated with one or more categories of data objects that meet the search criteria,
wherein the one or more categories of data objects include documents, pictures, and multimedia.

9. The method of claim 1 wherein displaying the metadata of the data objects includes displaying the metadata of the data objects in a computing device-agnostic hierarchy.

10. The method of claim 1, further comprising:
displaying, on the user interface, representations of computing devices associated with the user, wherein:
the representations of the computing devices associated with the user are labeled with user-provided names,
displaying the metadata of the data objects includes displaying the metadata of multiple copies of data objects having the same or similar content, and
each of the multiple copies of data objects originate from corresponding primary copies data objects that were generated by or stored on different ones of the computing devices associated with the user.

11. A non-transitory computer-readable storage medium whose contents cause a computing system to perform a method of operating a user interface for processing data objects stored in a storage system, the method comprising:
receiving a query from a user through a user interface for data objects based on object types, wherein:
the user interface is hosted by a storage manager of an information management system,
the storage manager includes a computing device configured to track and schedule data management operations for primary computing devices or secondary computing devices within the information management system,
scheduled data management operations include creating the secondary copies of data objects with the secondary computing devices, from primary copies of data objects generated by the primary computing devices,
the data objects include personal data objects that include content with a tag indicating that the content is of a personal nature with reference to the user, and include non-personal data objects that include content with a tag indicating that the content relates to a business or an employer of the user and that the content is not of a personal nature with reference to the user,
displaying a representation of an expandable folder associated with the data objects that satisfy the query and a folder name of the expandable folder that depends on the query and the user, wherein the representation of the folder includes metadata identifying duplicate data objects associated with the folder;
receiving a request from the user to set a storage policy for the folder related to archiving or retention of the data objects associated with the folder;
receiving a request from the user to de-duplicate part or all of data objects associated with the folder; and
displaying a client computing device navigator, in the user interface, to enable the user to navigate the retrieved metadata of data objects that satisfy the query, with reference to the user's personal computing devices from which a backup copy of the data objects was created,
wherein the client computing device navigator displays the user's personal computing devices that the user logged into to access, modify, or create one or more of the data objects that satisfy the query.

12. The computer-readable storage medium of claim 11, further comprising receiving a query from the user for data objects based on device types characterizing locations of the data objects within the storage system, wherein the device types include a user device or a storage server.

13. The computer-readable storage medium of claim 11, further comprising:
receiving a request to display information regarding one or more of the data objects associated with the folder; and
displaying metadata of each of the one or more data objects and of all duplicates of the one or more data object.

14. The computer-readable storage medium of claim 11, wherein the storage policy specifies a backup type, a backup frequency, an archive start date, or a retention period.

15. The computer-readable storage medium of claim 11, wherein the de-duplication applies to the data objects associated with the folder and stored in the storage system.

16. The computer-readable storage medium of claim 11, further comprising initiating a caching operation of the data objects associated with the folder on the computer system,
wherein the storage policy or the de-duplication applies to cached versions of the data objects associated with the folder.

17. The computer-readable storage medium of claim 11, further comprising:
initiating a caching operation of the data objects associated with the folder on the computer system, and
initializing a synchronization operation to synchronize part or all of cached versions of the data objects with the storage system.

18. A system for providing a unified view of a user's documents or files, across multiple user devices, wherein the system accesses an information management system that manages data for multiple users within an organization, the system comprising:
at least one memory for storing data;
at least one data input interface for receiving data input;
at least one display for displaying data;
at least one processor, coupled to the memory for storing data, the data input interface for receiving data input, and to the display, wherein:
the system is communicatively coupled to the information management system to access the user's documents or files;

the data input interface is hosted by a storage manager of the information management system;

the storage manager includes a computing device configured to track and schedule data management operations for primary computing devices or secondary computing devices within the information management system;

the scheduled data management operations include creating the secondary copies of data objects with the secondary computing devices, from primary copies of data objects generated by the primary computing devices;

the user's documents or files are provided from multiple devices of the user, so that the system provides a unified view, via the display, of the user's documents or files across the multiple devices of the user;

the multiple devices are displayed to the user with user-friendly names rather than logical pathnames;

the user's documents or files are displayed with file and folder hierarchies flattened out so that the user's documents or files are retrieved and displayed, regardless in which folders the user's documents or files are stored, the display of the user's documents or files includes a device identifier for one of the multiple devices on which the documents or files are stored;

the system displays at least one secondary copy of data stored, not on one of the multiple devices, but stored remotely and accessible by the system;

the display of the user's documents or files are de-duplicated so that only one copy is of each similar document or file displayed to the user; and, the system displays a client computing device explorer, in the uccr data input interface, to enable the user to explore retrieved metadata of data objects that satisfy a search criteria, with reference to the user's personal client computing devices from which a secondary copy of the data objects was created, wherein the data objects include personal data objects that include content with a tag indicating that the content is of a personal nature with reference to the user, and include non-personal data objects that include content with a tag indicating that the content relates to a business or an employer of the user and that the content is not of a personal nature with reference to the user, the client computing device explorer displays the user's personal computing devices that the user logged into to access, modify, or create one or more of the data objects that satisfy the search criteria.

19. The system of claim 18, wherein if the user selects the one copy, the system obtains a most readily accessible copy when multiple copies are available, and wherein the user's documents or files are displayed regardless of which of the multiple devices the user's documents or files are stored on.

* * * * *